(12) United States Patent  
Chu et al.

(10) Patent No.: US 10,617,492 B2  
(45) Date of Patent: Apr. 14, 2020

(54) DENTAL IMPLANT HAVING REVERSE-TAPERED MAIN BODY FOR ANTERIOR POST-EXTRACTION SOCKETS

(71) Applicant: Southern Implants (PTY) Ltd, Irene, Centurion (ZA)

(72) Inventors: Stephen John Chu, New York, NY (US); Graham Alan Blackbeard, Irene (ZA)

(73) Assignee: Southern Implants (PTY) Ltd, Irene (ZA)

( * ) Notice: Subject to any disclaimer, the term of this patent is extended or adjusted under 35 U.S.C. 154(b) by 33 days.

(21) Appl. No.: 15/618,989

(22) Filed: Jun. 9, 2017

(65) Prior Publication Data

US 2017/0354485 A1 Dec. 14, 2017

Related U.S. Application Data

(60) Provisional application No. 62/398,063, filed on Sep. 22, 2016, provisional application No. 62/349,816, filed on Jun. 14, 2016.

(51) Int. Cl.
*A61C 8/00* (2006.01)
*A61C 8/02* (2006.01)

(52) U.S. Cl.
CPC .......... *A61C 8/0037* (2013.01); *A61C 8/0006* (2013.01); *A61C 8/0022* (2013.01); *A61C 8/0056* (2013.01); *A61C 2008/0046* (2013.01)

(58) Field of Classification Search
CPC .............................................. A61C 8/00–0045

(Continued)

(56) References Cited

U.S. PATENT DOCUMENTS 2,721,387 A * 10/1955 Ashuckian ........... A61C 8/0018
433/173
3,708,883 A * 1/1973 Flander ................ A61C 8/0033
433/174

(Continued)

FOREIGN PATENT DOCUMENTS

DE 102008063397 A1 7/2010
FR 2732890 10/1996

(Continued)

OTHER PUBLICATIONS

Abrahamsson, I. et al.; "Tissue characteristics at microthreaded implants: an experimental study in dogs"; Clin. Impl. Dent. & Rel. Res., vol. 8, pp. 107-113; 2006.

(Continued)

*Primary Examiner* — Matthew M Nelson
(74) *Attorney, Agent, or Firm* — Nixon Peabody LLP

(57) ABSTRACT

A dental implant includes a body and a threaded surface. The body has an upper portion, a middle portion, and a lower portion. The upper portion of the body includes a generally cylindrical region. The lower portion of the body includes a generally inwardly tapered region. The middle portion of the body includes an outwardly extending bulge. A maximum outer diameter of the bulge is greater than (i) a maximum outer diameter of the upper portion and (ii) a maximum outer diameter of the lower portion. The threaded surface is on the body within at least the upper portion of the body, the bulge, and the lower portion of the body.

71 Claims, 12 Drawing Sheets

(58) Field of Classification Search
USPC .................................................. 433/172–176
See application file for complete search history.

(56) References Cited

U.S. PATENT DOCUMENTS

| | | | |
|---|---|---|---|
| 4,722,688 A | 2/1988 | Lonca | |
| 5,489,210 A * | 2/1996 | Hanosh | A61C 8/0033 433/173 |
| 5,759,034 A | 6/1998 | Daftary | |
| 6,007,337 A * | 12/1999 | Bauer | A61C 8/0033 433/173 |
| 6,039,568 A | 3/2000 | Hinds | |
| 6,220,861 B1 * | 4/2001 | Kwon | A61C 8/0018 433/173 |
| 6,227,860 B1 * | 5/2001 | Hobo | A61C 8/0033 433/173 |
| 6,332,778 B1 * | 12/2001 | Choung | A61C 8/0033 433/172 |
| 8,197,255 B2 | 6/2012 | Fromovich | |
| 8,486,120 B2 * | 7/2013 | Shimko | A61C 8/0074 411/55 |
| 2006/0003290 A1 | 1/2006 | Niznick | |
| 2006/0194171 A1 * | 8/2006 | Lazarof | A61C 8/0033 433/173 |
| 2006/0223030 A1 | 10/2006 | Dinkelacker | |
| 2009/0239195 A1 | 9/2009 | Wohrle | |
| 2010/0316970 A1 * | 12/2010 | Shih | A61C 8/0022 433/174 |
| 2014/0106305 A1 | 4/2014 | Jacoby | |
| 2014/0200620 A1 * | 7/2014 | Yahav | A61C 8/0022 606/315 |
| 2015/0017605 A1 | 1/2015 | Su | |
| 2016/0008102 A1 * | 1/2016 | Lomicka | A61C 8/0012 433/201.1 |

FOREIGN PATENT DOCUMENTS

| | | |
|---|---|---|
| KR | 100473141 B1 | 2/2005 |
| KR | 100808500 B1 | 2/2008 |
| WO | WO 2008/157137 A1 | 12/2008 |
| WO | WO 2008/157138 A2 | 12/2008 |
| WO | WO 2012/164560 A1 | 12/2012 |
| WO | WO 2012/173577 A1 | 12/2012 |
| WO | WO 2015/115692 A1 | 8/2015 |
| WO | WO 2015/125139 A2 | 8/2015 |
| WO | WO 2016/016236 A1 | 2/2016 |
| WO | WO-2016016236 A1 * | 2/2016 ........... A61C 8/0022 |

OTHER PUBLICATIONS

Abrahamsson, I. et al.; "Early bone formation adjacent to rough and turned endosseous implant surfaces. An experimental study in the dog"; Clin. Oral Impl. Res., vol. 15, pp. 381-392; 2004.

Abuhussein, H. et al.; "The effect of thread pattern upon implant osseointegration"; Clin. Oral Impl. Res., vol. 21, pp. 129-136; 2010 (8 pages).

Akca, K. et al.; "Biomechanical aspects of initial intraosseous stability and implant design: a quantitative micro-morphometric analysis"; Clin. Oral Impl. Res., vol. 17, pp. 465-472; 2006.

Berglundh, T. et al.; "De novo alveolar bone formation adjacent to endosseous implants"; Clin. Oral Impl. Res., vol. 14, pp. 251-262; 2003.

Bernhardt, R. et al.; "Comparison of bone-implant contact and bone-implant volume between 2D-histological sections and 3D-SRmicroCT slices"; European Cells & Materials, vol. 23, pp. 237-247, discussion 247-238; 2012.

Butz, F. et al.; "Three-dimensional bone-implant integration profiling using micro-computed tomography"; Intl. J. Oral and Maxillofacial Impl., vol. 21, pp. 687-695; 2006.

Chang, Y.-Y. et al.; "Effect of microthreads on coronal bone healing of narrow-diameter implants with reverse-tapered design in beagle dogs"; Clin. Oral Impl. Res., vol. 28, pp. 1532-1542; Apr. 7, 2017 (11 pages).

Chang, Y.-Y. et al.; "Evaluation of a Reverse-Tapered Design on the Osseointegration of Narrow-Diameter Implants in Beagle Dogs: A Pilot Study"; Intl. J. Oral & Maxillofac. Impl., vol. 31, No. 3, pp. 611-620; May/Jun. 2016 (10 pages) (actual date in May or Jun. 2016 is unknown).

Chang, Y.Y. et al.; "Evaluation of functional dynamics during osseointegration and regeneration associated with oral implants"; Clin. Oral Impl. Res., vol. 21, pp. 1-12; 2010.

Chang, Y.Y. et al.; "Evaluation of narrow-diameter implant with trapezoidal-shape design and microthreads in beagle dogs: pilot study": J. Korean Dent. Assoc., vol. 54, pp. 529-540; 2016, published in Korean.

Chiapasco, M. et al.; "Titanium-zirconium alloy narrow-diameter implants (Straumann Roxolid ((R))) for the rehabilitation of horizontally deficient edentulous ridges: prospective study on 18 consecutive patients"; Clinical Oral Implants Research, vol. 23, pp. 1136-1141; 2012.

Faul, F. et al.; "Statistical power analyses using G*Power 3.1: tests for correlation and regression analyses"; Behavior Research Methods, vol. 41, pp. 1149-1160; 2009.

Hansson, S.; "The implant neck: smooth or provided with retention elements. A biomechanical approach"; Clinical Oral Implants Research, vol. 10, pp. 394-405; 1999.

Kilkenny, C. et al.; "Improving bioscience research reporting: ARRIVE-ing at a solution"; Laboratory Animals, vol. 44, pp. 377-378; 2010.

Kilkenny, C. et al.; "Improving bioscience research reporting: the ARRIVE guidelines for reporting animal research"; J. Pharmacol. & Pharmacother.; vol. 1, pp. 94-99; 2010.

Lang, N.P. et al.; "Early osseointegration to hydrophilic and hydrophobic implant surfaces in humans"; Clin. Oral Impl. Res., vol. 22, pp. 349-356; 2011.

Lee, D.W. et al.; "Effect of microthread on the maintenance of marginal bone level: a 3-year prospective study"; Clin. Oral Impl. Res.; vol. 18, pp. 465-470; 2007.

Park, J.W. et al.; "Effects of calcium ion incorporation on bone healing of Ti6Al4V alloy implants in rabbit tibiae"; Biomaterials, vol. 28, pp. 3306-3313; 2007.

Rebaudi, A. et al.; "Microcomputed tomographic analysis of the peri-implant bone"; Intl. J. Periodont. Restor. Dent., vol. 24, pp. 316-325; 2004.

Romeo, E. et al.; "Clinical and radiographic evaluation of small-diameter (3.3-mm) implants followed for 1-7 years: a longitudinal study"; Clin. Oral Impl. Res., vol. 17, pp. 139-148; 2006.

Schouten, C. et al.; "The quantitative assessment of peri-implant bone responses using histomorphometry and micro-computed tomography"; Biomaterials, vol. 30, pp. 4539-4549; 2009.

Suh, J.Y. et al.; "Effects of a novel calcium titanate coating on the osseointegration of blasted endosseous implants in rabbit tibiae"; Clin. Oral Impl. Res., vol. 18, pp. 362-369; 2007.

International Preliminary Report on Patentability for International Application No. PCT/IL2012/000218, dated Dec. 2, 2013 (6 pages).

International Search Report and Written Opinion for International Application No. PCT/IB2017/053440, dated Dec. 13, 2017. (17 pages).

* cited by examiner

DENTAL IMPLANT HAVING REVERSE-TAPERED MAIN BODY FOR ANTERIOR POST-EXTRACTION SOCKETS

CROSS-REFERENCE TO RELATED APPLICATIONS

This application claims the benefit of and priority to U.S. Provisional Application No. 62/398,063, filed Sep. 22, 2016, and U.S. Provisional Application No. 62/349,816, filed Jun. 14, 2016, each of which is hereby incorporated by reference herein in its entirety.

TECHNICAL FIELD

The present disclosure relates generally to the field of implant dentistry, oral surgery, and periodontics; in particular, to a dental implant having a reverse-tapered main body that is particularly useful for anterior post-extraction sockets.

BACKGROUND

In an era of dentistry driven by high esthetic demands and standards, flapless post-extraction dental implant placement with hard and soft tissue loss can pose a considerable aesthetic, surgical, and/or restorative challenge. In vivo studies have reported that dental implants placed into post-extraction sockets do not alter the wound healing and remodeling process of the socket nor preserve the labial bone plate especially in the anterior region of the mouth where the labial bone plate is approximately 0.5-1.0 millimeters in thickness post tooth extraction. Dental implants that are too wide in diameter that completely fill the extraction socket or that are placed too close to the labial bone plate will result in loss of labial bone subsequent to remodeling. This dimensional change can lead to ridge collapse, thinning of the peri-implant soft tissues, and gingival tissue discoloration due to labial bone plate loss. It is important to consider proper hard and soft tissue management when managing flapless post-extraction dental implants in the aesthetic zone.

Several clinical procedures have been proposed to assist in addressing the disadvantages associated with flapless post-extraction dental implant placement and tissue loss. In vivo studies have shown that dental implant position and diameter play a significant role in maintaining the labial bone plate height with full osseointegration, without the aid of a bone or hard tissue graft. The former strategy being palatal dental implant positioning within the extraction socket and 'gap distance' between the facial surface of the dental implant and residual labial plate thereby allowing a blood clot to fill the gap and organize into granulation tissue predetermined to form new bone. The latter strategy uses smaller diameter dental implants in order to create a favorable gap distance for the labial blood clot. Thus, new labial bone plate formation may be achieved by the use of smaller diameter dental implants placed in a palatal position within the extraction socket.

The labial bone plate can collapse about 1.0 millimeter even though osseointegration can be achieved. Minimizing labial bone plate collapse is important to achieve satisfactory aesthetics. Studies have shown that bone grafting the gap can limit the amount of ridge shape change both clinically and on cone beam computer tomography (CBCT) to 0.1 millimeters. Xenografts and allografts have been analyzed in these studies. Therefore, it is of clinical significance to maintain a gap distance after dental implant placement for not only blood clot formation but also bone graft placement to maximize outcomes of dental implants placed into post-extraction sockets. The bone material acts as a filler or scaffold to maintain the volume of the blood clot for new bone formation.

One problem with using smaller diameter dental implants is that they can result in decreased primary stability of the dental implant since the lateral surrounding walls of the extraction socket are rarely engaged in total, nor should they be due to the aforementioned socket remodeling. Primary stability of dental implants in extractions socket should achieve a minimum of 25 Newton-Centimeters (Ncm) of insertion torque to reach 96% survival rate. One technique to achieve adequate primary stability (e.g., >25 Ncm) is engaging the apical-palatal bone beneath the floor of the nose anatomically, with smaller diameter dental implants. Thus, longer dental implant lengths are required (e.g., 15 millimeters) to obtain satisfactory primary stability, though using such longer dental implant increases the risk of perforating the base/floor of the nose. Another strategy in achieving adequate initial primary stability in extraction sockets is using a wider diameter implant with the trade-off being a decreased gap distance between the dental implant and labial bone plate.

Prior dental implant designs typically include threaded or screw shapes with a tapered body from coronal to apical; the coronal aspect of the dental implant head being wider at the top versus a more narrow diameter at the base or lowermost end of the dental implant. This typical design mimics the natural extraction socket in the patient's mouth in shape and form. Anatomically, the apical area of the extraction socket has thicker labial bone and coronally the labial bone is thinner. As the apical region of typical tapered dental implants is smaller in diameter (e.g., as compared with the coronal region of typical dental implants), the apical region may not offer enough surface area to achieve adequate primary stability when installed, especially when using a surgical strategy involving a decreased dental implant length for fear of perforating the base/floor of the nose. In addition, typical tapered dental implants are wider at the top (e.g., coronally) thereby decreasing the gap distance between the upper neck of the dental implant and the extraction socket. Consequently, wider diameter tapered dental implants are typically used to increase dental implant primary stability (e.g., a 5 millimeter dental implant might be used instead of a 4 millimeter dental implant), thereby decreasing the labial gap distance and thus impeding subsequent blood clot formation with bone grafting, which is ideal for forming new labial bone plate between the dental implant and the extraction socket.

Another factor in dental implant design relative to dental implant placement is that with typical tapered dental implants being wider at the top, this negatively impacts palatal placement. As the dental implant is placed and driven into the extraction socket apically, the wider neck may engage the palatal bone plate and may bounce/move or angulate the dental implant more to the facial aspect of the extraction socket. This can result in undesirable labial placement and angulation of the dental implant and potentially a decreased gap distance between the dental implant and the facial aspect/side of the extraction socket.

Another factor in dental implant design is dental implant position relative to adjacent teeth or adjacent dental implants. Some studies have shown that close proximity of adjacent dental implants can cause interproximal attachment (e.g., of hard and/or soft tissue) or papilla loss and consequently cause black interdental triangles between teeth and/or dental implants.

Some previous dental implants have attempted to provide a segmented non-continuous gap between the coronal portion of the dental implant and the osteotomy site or extraction socket by eliminating a side portion of the dental implant making a flat cutout or cutaway portion. However, during installation, such dental implants must be installed with a specific rotational position relative to the socket such that the flat cutout is aligned with, for example, the buccal bone plate in the mouth of the patient. Otherwise the dental implant will not promote bone growth in the desired location.

Thus, a need exists for dental implants with relatively wider apical portions to increase primary stability of the dental implant while promoting bone growth in desired locations, but without requiring rotational-orientation restrictions during installation. The present disclosure is directed to solving these problems and addressing other needs.

BRIEF SUMMARY

The present disclosure is generally directed towards dental implants having a reverse tapered body configuration where at least a portion (e.g., 30 percent to 50 percent) of the length of the body diameter increases apically (e.g., in a direction towards the lowermost end or apical end or bottom of the dental implant). Such a body configuration improves primary stability in the apical portion of the dental implant (e.g., as compared with a dental implant with a typically tapered configuration that decreases apically in a uniform manner) and increases a gap distance coronally between the coronal portion of the dental implant and the extraction socket (e.g., where the labial bone plate is typically thinner as compared with the bone more apical in the extraction socket receiving the dental implant). The gap distance extends 360 degrees around the dental implant with flexibility in dental implant placement to achieve a relatively greater gap distance on the labial side (e.g., as compared with the gap distance on the palatal side). In addition, a relatively narrower diameter neck of the dental implant eliminates and/or reduces a palatal 'bounce effect' during installation and unwanted facial implant angulation (e.g., even with intended palatal placement bias).

According to some implementations of the present disclosure, a dental implant has a body shift diameter that aids in maintaining a minimum interproximal distance between teeth and the dental implant of about 1.5 millimeters on each side (e.g., 3.0 millimeters in total) even without platform switching of the dental implant-abutment connection.

According to some implementations of the present disclosure, greater primary stability in the apical portion of the dental implant (e.g., as compared with a dental implant with a typically tapered configuration that decreases apically in a uniform manner) is achieved through a wider diameter tapered apical area that is about one-third to about one-half of the length of the entire body of the dental implant. The apical portion of the dental implant can be configured to engage the extraction socket immediately after a tooth has been extracted.

According to some implementations of the present disclosure, a dental implant includes a macro thread configuration with an aggressive thread pitch, which aids in increasing primary stability of the dental implant. In some such implementations, the thread pitch is about 0.6 millimeters and the thread depth is about 0.4 millimeters. In some other such implementations, the thread pitch is about 0.8 millimeters and the thread depth is about 0.5 millimeters. In some implementations, the thread pitch is between about 0.5 millimeters and about 2.5 millimeters. In some other implementations, the thread pitch is between about 0.6 millimeters and about 2 millimeters.

According to some implementations of the present disclosure, a dental implant aids in hard tissue maintenance and preservation by providing a relatively increased labial gap distance between the coronal portion of the dental implant and at least a portion of the extraction socket. The dental implant includes a shift in body diameter from the apical portion to the coronal portion as compared with typical tapered dental implants, which results in (i) a relatively narrower coronal portion and (ii) an outwardly extended bulge feature in the apical portion of the dental implant. As such, the coronal portion of the dental implant is able to provide a relatively larger gap distance between the dental implant and the extraction socket near the coronal end of the extraction socket. In addition, the relatively smaller diameter of the dental implant at the coronal end thereof eliminates and/or reduces a palatal 'bounce effect' when the dental implant is positioned more palatal in the extraction socket. The relatively smaller diameter head or connection of the dental implant promotes ease of fitting prosthetic components at the implant-abutment interface.

According to some implementations of the present disclosure, a dental implant includes a coronal portion with a relatively narrower diameter (as compared with the diameter of an apical portion of the dental implant) about its entire circumference (e.g., the coronal portion is generally cylindrical). As such, the dental implant is not rotationally constricted during installation, thereby ensuring that bone growth is promoted at the correct location in the socket of the mouth of the patient (e.g., adjacent to the labial bone plate and/or the buccal bone plate).

According to some implementations of the present disclosure, a dental implant includes a body and a threaded surface. The body has an upper portion, a middle portion, and a lower portion. The upper portion of the body includes a generally cylindrical region. The lower portion of the body includes a generally inwardly tapered region. The middle portion of the body includes an outwardly extending bulge. A maximum outer diameter of the bulge is greater than (i) a maximum outer diameter of the upper portion and (ii) a maximum outer diameter of the lower portion. The threaded surface is on the body within at least the upper portion of the body, the bulge, and the lower portion of the body.

According to some implementations of the present disclosure, a dental implant for installation in a socket in a mouth of a patient is provided. The socket is formed by bone. The dental implant includes a body and a threaded surface. The body has a coronal portion and an apical portion. The coronal portion has an exterior surface that is sized and configured to promote bone growth of at least a portion of the bone of the socket in the mouth of the patient after installation of the dental implant therein. The apical portion has an exterior surface that is sized and configured to anchor the dental implant in the bone of the socket in the mouth of the patient. The exterior surface of the coronal portion is generally cylindrical. The apical portion includes an outwardly tapered portion and an inwardly tapered portion that together form a bulge feature in the apical portion of the body that aids in the anchoring of the dental implant in the bone. The threaded surface is on the body within at least the coronal portion and the bulge feature.

According to some implementations of the present disclosure, a dental implant includes a body, an interior bore, and a non-rotational feature. The body has a threaded coronal portion and a threaded apical portion for anchoring the dental implant in bone of a patient. The threaded coronal portion is generally cylindrical. The threaded apical portion includes a threaded outwardly tapered portion and a threaded inwardly tapered portion. An outer diameter of the threaded outwardly tapered portion increases apically. An outer diameter of the threaded inwardly tapered portion decreases apically. A maximum outer diameter of the threaded coronal portion of the body is less than (i) a maximum outer diameter of the threaded outwardly tapered portion and (ii) a maximum outer diameter of the threaded inwardly tapered portion. The interior bore is formed in the body and has a threaded portion for receiving a screw configured to hold an abutment in engagement with the dental implant in a removable and retrievable fashion. The non-rotational feature is configured to engage the abutment in a non-rotational fashion. The non-rotational feature is positioned opposite from a lowermost end of the apical portion of the body.

According to some implementations of the present disclosure, a dental implant for installation in a socket in a mouth of a patient is provided. The socket is formed by bone. The dental implant includes a body and a threaded surface. The body has a coronal portion and an apical portion. The coronal portion has an exterior surface that is sized and configured to promote bone growth of at least a portion of the bone of the socket in the mouth of the patient after installation of the dental implant therein. The apical portion has an exterior surface that is sized and configured to anchor the dental implant in the bone of the socket in the mouth of the patient. The exterior surface of a section of the coronal portion is generally cylindrical and roughened. The apical portion includes a first outwardly tapered portion and a first inwardly tapered portion that together form a first bulge feature in the apical portion of the body that aids in the anchoring of the dental implant in the bone. The threaded surface on the body is within the first bulge feature and not within the section of the generally cylindrical, roughened coronal portion. In some such implementations, the apical portion further includes a second outwardly tapered portion and a second inwardly tapered portion that together form a second bulge feature in the apical portion of the body that further aids in the anchoring of the dental implant in the bone. In some such implementations, the first bulge feature is more apical than the second bulge feature and a maximum outer diameter of the second bulge feature is at least five percent greater than a maximum outer diameter of the first bulge feature.

According to some implementations of the present disclosure, a dental implant for installation in a socket in a mouth of a patient includes a body having an upper portion configured to engage an abutment and a lower portion configured to be inserted into the socket to engage bone within the socket. The body includes two distinct regions located between the upper portion and the lower portion. Each of the two distinct regions has a maximum outer diameter that is greater than a maximum outer diameter of the upper portion and a maximum outer diameter of the lower portion. The body includes external threads.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

Figure 1A:
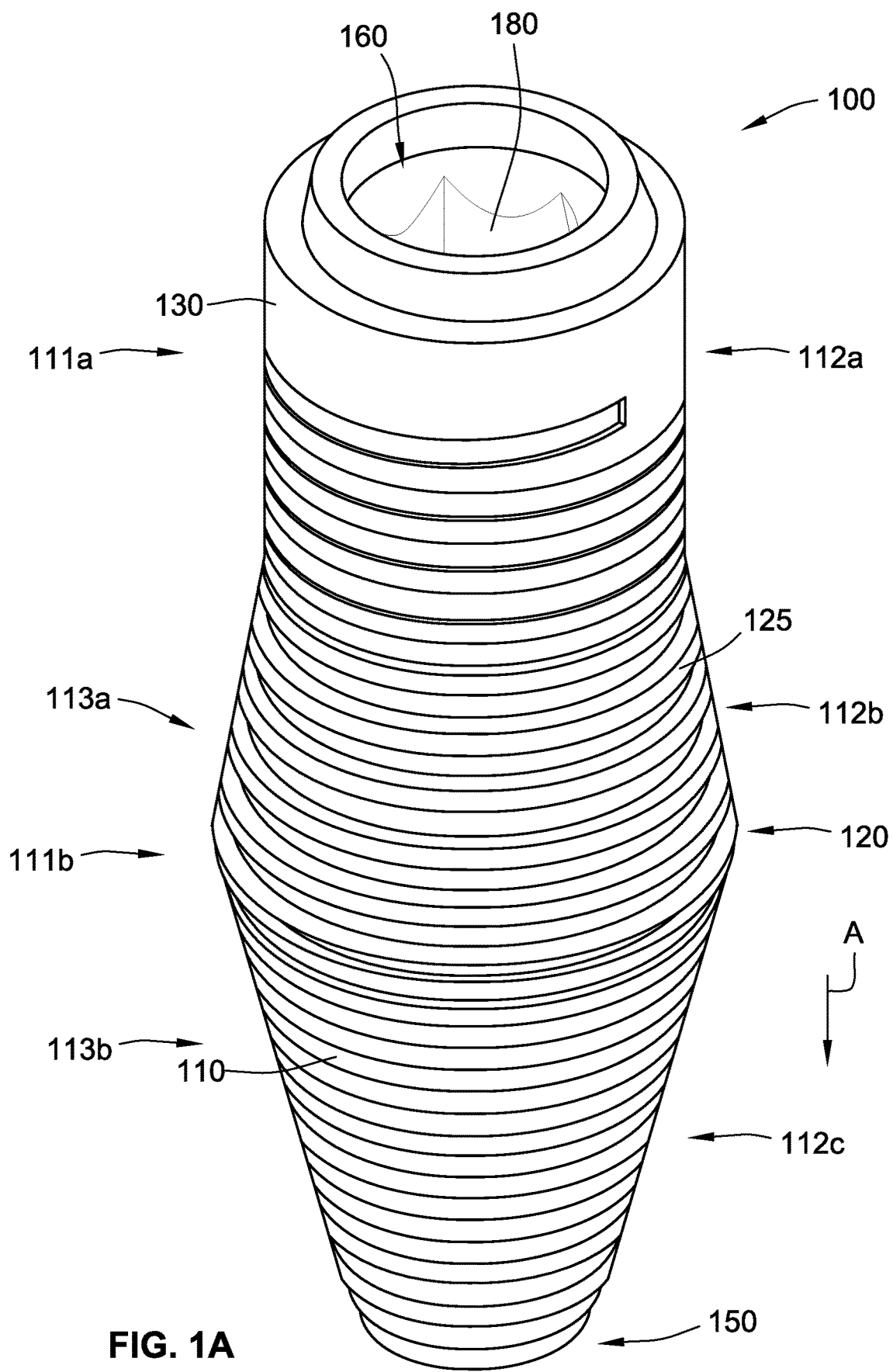
FIG. 1A is a perspective view of a straight-bore dental implant according to some implementations of the present disclosure.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Figure 1B:
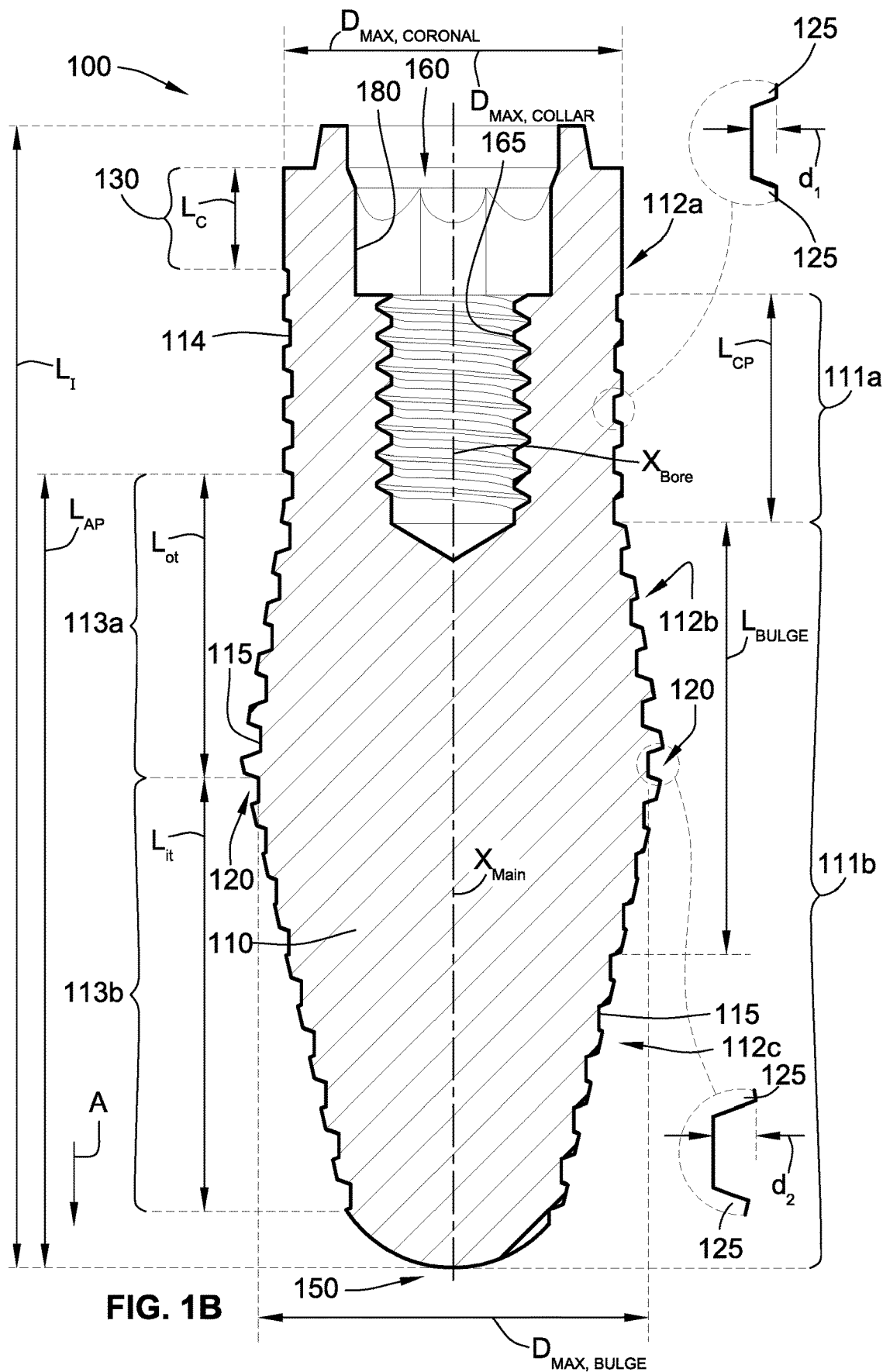
FIG. 1B is a cross-sectional view of the dental implant shown in FIG. 1A.
Figure 3A:
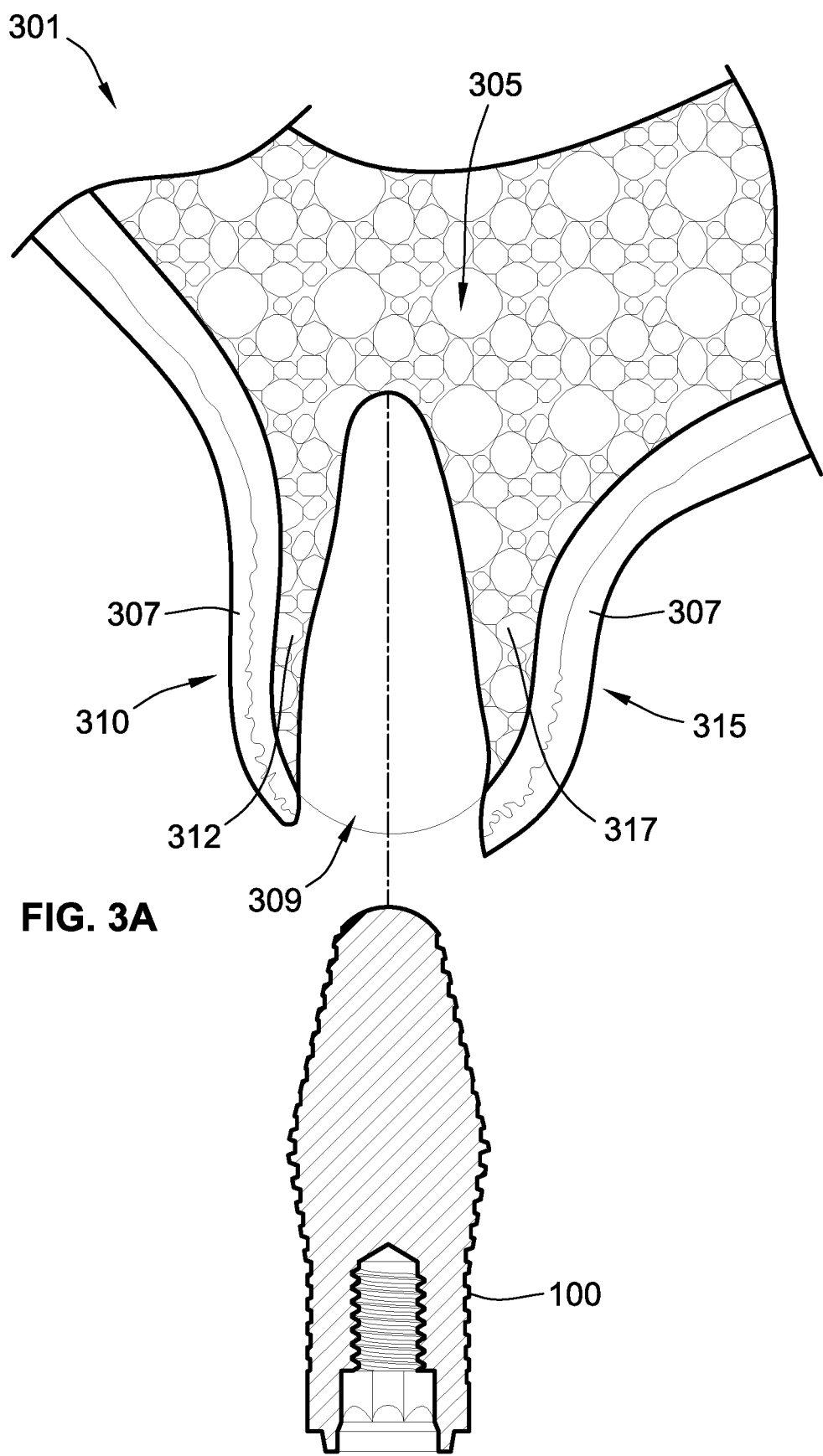
FIG. 3A is a partial cross-sectional view of a mouth of a patient having an extraction socket to receive the dental implant of FIG. 1A according to some implementations of the present disclosure.

Referring generally to FIGS. 1A-1B, a dental implant 100 is shown for installation into a socket in a mouth of a patient (e.g., extraction socket 309 in FIG. 3A). The dental implant 100 includes a body 110, an interior bore 160, and a non-rotational feature 180. The body 110 has a coronal portion 111a and an apical portion 111b.

The body 110 of the dental implant 100 has a main-central axis $X_{main}$. The main-central axis $X_{main}$ is defined as a straight axis/line that goes through the geometric center and/or the axis of symmetry of at least the apical portion 111b of the body 110 of the dental implant 100. As shown in FIGS. 1A and 1B, the main-central axis $X_{main}$ of the dental implant 100 also goes through the geometric center and/or the axis of symmetry of the coronal portion 111a of the body 110 of the dental implant 100. This is because the dental implant 100 is a straight-bore dental implant as opposed to an angled-bore dental implants described herein in reference to FIGS. 2A and 2B.

The coronal portion 111a of the body 110 has an exterior surface 114 that is sized and configured to promote bone growth of at least a portion of bone (e.g., the buccal bone plate) of the extraction socket in the mouth of the patient after installation of the dental implant 100 therein. By sized and configured to promote bone growth, it is generally meant that the coronal portion 111a is relatively narrower than the extraction socket to provide a gap (e.g., gap G in FIG. 3C) between at least a portion of the coronal portion 111a and a wall of the socket. As such, the gap permits blood to clot therebetween, which can promote new bone growth, as well as providing a space for grafting materials. The gap has a width preferably between about 0.5 millimeters and about 3 millimeters. In some implementations, the gap has a width of about 1.5 millimeters. As shown in FIGS. 1A and 1B, the coronal portion 111a of the body 110 has a generally cylindrical shape with a generally constant outer diameter $D_{MAX,coronal}$, except for a thread 125 wrapped therearound. Various other shapes and sizes of the coronal portion 111a of the body 110 are contemplated, such as, for example, outwardly tapered, inwardly tapered, curved (concave, convex, etc.), flat, triangular, square, rectangular, hexagonal, polygonal, or any combination thereof.

The apical portion 111b of the body 110 has an exterior surface 115 that is sized and configured to anchor the dental implant 100 in the bone of the socket in the mouth of the patient. The apical portion 111b includes an outwardly tapered portion 113a and an inwardly tapered portion 113b that together form a bulge feature 120 in the apical portion 111b of the body 110. The bulge feature 120 aids in anchoring the dental implant 100 in the bone of the socket by providing a relatively wider portion (e.g., as compared with the coronal portion 111a) of the body 110 apically where the bone in the socket is typically thicker. As such, the dental implant 100 can be installed with sufficient and/or relatively greater primary stability than a dental implant without such a bulge feature 120. The bulge feature 120 extends outwardly from the body 110 for 360 degrees around the apical portion 111b of the body 110. The bulge feature 120 is generally symmetric about the main-central axis $X_{Main}$ of the dental implant 100. By generally symmetric it is meant that the exterior surface 115 of the apical portion 111b is symmetric, but that the thread 125 that wraps around the bulge feature 120 is not exactly symmetric about the main-central axis $X_{Main}$ of the dental implant 100 (e.g., due to the thread 125 having a pitch). By including the bulge feature 120 in the apical portion 111b, the coronal portion 111a is able to have a relatively narrower outer diameter, which allows for a relatively larger gap between the exterior surface 114 of the coronal portion 111a and the wall of the socket into which the dental implant 100 is installed.

The outwardly tapered portion 113a of the apical portion 111b has an outer diameter that increases along the outwardly tapered portion 113a in an apical direction and/or towards a lowermost end 150 of the apical portion 111b (e.g., in the direction of arrow A), which is also referred to as the apical end 150 of the dental implant 100 that is opposite the coronal end or the uppermost end of the coronal portion 111a of the dental implant 100. The inwardly tapered portion 113b has an outer diameter that decreases along the inwardly tapered portion 113b in the apical direction and/or towards the lowermost end 150 of the apical portion 111b (e.g., in the direction of arrow A). The exterior surface 115 of the outwardly tapered portion 113a forms a generally straight taper. Alternatively, the exterior surface 115 of the outwardly tapered portion 113a can form a generally curved taper (e.g., a convex curved taper) and/or a combination of a straight and curved taper. The exterior surface 115 of the inwardly tapered portion 113b forms a generally straight taper. Alternatively, the exterior surface 115 of the inwardly tapered portion 113b can form a generally curved taper (e.g., a convex curved taper) and/or a combination of a straight and curved taper.

The coronal portion 111a can be referred to as a threaded coronal portion 111a as the exterior surface 114 of the coronal portion 111a has at least a portion of the thread 125 wrapped therearound. Similarly, the apical portion 111b can be referred to as a threaded apical portion 111b as the exterior surface 115 of the apical portion 111b has at least a portion of the thread 125 wrapped therearound.

The thread 125 can be a single thread 125, or the thread 125 can include two or more threads (e.g., two threads blended together) having one or more starts with any number of pitches and/or thread depths. In some implementations, the thread 125 includes a first thread wrapped around the coronal portion 111a and a second thread wrapped around the apical portion 111b. In some such implementations, the first thread is a micro thread and the second thread is a macro thread. The first thread and the second thread can have the same or different thread pitches (e.g., longitudinal distance between consecutive peaks, crest-to-crest distance, trough-to-trough distance) and/or the same or different thread depths. As shown in FIG. 1B, the thread 125 in the coronal portion 111a has a first thread depth $d_1$ and the thread 125 in the apical portion 111b has a second thread depth $d_2$. In some implementations, the first thread depth $d_1$ is between about 0.1 millimeters and about 0.7 millimeters (e.g., about 0.1, 0.2, 0.3, 0.4, 0.5, 0.6, 0.7 millimeters). Similarly, the second thread depth $d_2$ is between about 0.1 millimeters and about 0.7 millimeters (e.g., about 0.1, 0.2, 0.3, 0.4, 0.5, 0.6, 0.7 millimeters). In some implementations, the first thread depth $d_1$ is between about 0.1 millimeters and about 0.2 millimeters and the second thread depth $d_2$ is between about 0.4 millimeters and about 0.5 millimeters. As best shown in FIG. 1B, the second thread depth $d_2$ is larger than the first thread depth $d_1$, although various other thread depths are contemplated.

The body 110 can include one or more generally vertical flutes (not shown) and/or one or more non-vertical flutes (see for example flutes 570 shown in FIG. 5), such as, for example, one or more spiral flutes. Such flutes can be positioned in the inwardly tapered portion 113b to aid a self-tapping action of the dental implant 100. As shown in FIGS. 1A and 1B, the lowermost end 150 of the apical portion 111b of the body 110 terminates in a rounded dome shape. Such a shape aids in limiting the self-tapping action of the dental implant 100 when including the one or more flutes (not shown). The limiting of the self-tapping action can prevent an inadvertent puncture of the nasal floor during installation of a dental implant in a mouth of a patient.

The body 110 is described herein as including the coronal portion 111b and the apical portion 111b. The body 110 also includes a collar 130 that is positioned above the coronal portion 111a. The collar 130 is not threaded (e.g., the thread 125 is not wrapped around the collar 130) and has a generally smooth exterior surface.

The dental implant 100 has an overall length $L_I$, which can be, for example, between about 10 millimeters and about 18 millimeters (e.g., the overall length $L_I$ of the dental implant 100 can be 10, 11, 12, 13, 14, 15, 16, 17, 18, etc. millimeters). The length of the dental implant 100 is selected depending on the location in which the dental implant 100 is being installed and the naturally occurring anatomy of the patient receiving the dental implant 100.

The bulge feature 120 has a length $L_{Bulge}$, which can be, for example, between about 4 millimeters and about 9 millimeters (e.g., the length $L_{Bulge}$ of the bulge feature 120 can be about 4, 5, 6, 7, 8, 9 millimeters). In some implementations, the length $L_{Bulge}$ of the bulge feature 120 is about 30 percent to about 60 percent of the overall length $L_I$ of the dental implant 100. In some other implementations, the length $L_{Bulge}$ of the bulge feature 120 is about 40 percent to about 50 percent of the overall length $L_I$ of the dental implant 100. For example, the length $L_{Bulge}$ of the bulge feature 120 is about 30, 35, 40, 45, 50, 55, or 60 percent of the overall length $L_I$ of the dental implant 100.

The coronal portion 111a has a length $L_{CP}$, which can be, for example, between about 1.5 millimeters and about 9 millimeters (e.g., the length $L_{CP}$ of the coronal portion 111a can be about 1.5, 2, 2.5, 3, 3.5, 4, 4.5, 5, 5.5, 6, 6.5, 7, 7.5, 8, 8.5, 9 millimeters). In some implementations, the length $L_{CP}$ of the coronal portion 111a is about 10 percent to about 50 percent of the overall length $L_I$ of the dental implant 100. In some other implementations, the length $L_{CP}$ of the coronal portion 111a is about 15 percent to about 30 percent of the overall length $L_I$ of the dental implant 100. For example, the length $L_{CP}$ of the coronal portion 111a is about 10, 15, 20, 25, 30, 35, 40, 45, 50 percent of the overall length $L_I$ of the dental implant 100.

The apical portion 111b has a length $L_{AP}$, which can be, for example, between about 6 millimeters and about 16 millimeters (e.g., the length L of the apical portion 111b can be about 6, 6.5, 7, 7.5, 8, 8.5, 9, 9.5, 10, 10.5, 11, 11.5, 12, 12.5, 13, 13.5, 14, 14.5, 15, 15.5, 16 millimeters). In some implementations, the length $L_{AP}$ of the apical portion 111b is about 50 percent to about 90 percent of the overall length $L_I$ of the dental implant 100. In some other implementations, the length L of the apical portion 111b is about 70 percent to about 85 percent of the overall length $L_I$ of the dental implant 100. For example, the length L of the apical portion 111b is about 50, 55, 60, 65, 70, 75, 80, 85, 90 percent of the overall length $L_I$ of the dental implant 100.

The collar 130 has a length $L_C$, which can be, for example, between about 0.5 millimeters and about 3 millimeters (e.g., the length $L_C$ of the collar 130 can be about 0.5, 1.0, 1.5, 2, 2.5, 3 millimeters). In some implementations, the length $L_C$ of the collar 130 is about 5 percent to about 20 percent of the overall length $L_I$ of the dental implant 100. In some other implementations, the length $L_C$ of the collar 130 is about 15 percent to about 20 percent of the overall length $L_I$ of the dental implant 100. For example, the length $L_C$ of the collar 130 is about 5, 10, 15, 20 percent of the overall length $L_I$ of the dental implant 100.

The outwardly tapered portion 113a has a length $L_{ot}$, which can be, for example, between about 1 millimeter and about 5 millimeters (e.g., the length $L_{ot}$ of the outwardly tapered portion 113a can be about 1, 1.5, 2, 2.5, 3, 3.5, 4, 4.5, 5 millimeters). In some implementations, the length $L_{ot}$ of the outwardly tapered portion 113a is about 10 percent to about 30 percent of the overall length $L_I$ of the dental implant 100. In some other implementations, the length $L_{ot}$ of the outwardly tapered portion 113a is about 15 percent to about 25 percent of the overall length $L_I$ of the dental implant 100. For example, the length $L_{ot}$ of the outwardly tapered portion 113a is about 10, 15, 20, 25, 30 percent of the overall length $L_I$ of the dental implant 100.

The inwardly tapered portion 113b has a length $L_{it}$, which can be, for example, between about 4 millimeters and about 9 millimeters (e.g., the length $L_{it}$ of the inwardly tapered portion 113b can be about 4, 4.5, 5, 5.5, 6, 6.5, 7, 7.5, 8, 8.5, 9 millimeters). In some implementations, the length $L_{it}$ of the inwardly tapered portion 113b is about 30 percent to about 80 percent of the overall length $L_I$ of the dental implant 100. In some other implementations, the length $L_{it}$ of the inwardly tapered portion 113b is about 40 percent to about 50 percent of the overall length $L_I$ of the dental implant 100. For example, the length $L_{it}$ of the inwardly tapered portion 113b is about 30, 35, 40, 45, 50, 55, 60, 65, 70, 75, 80 percent of the overall length $L_I$ of the dental implant 100.

To further describe the bulge feature 120, reference is made to several outer diameter relationships of the body 110 of the dental implant 100. For example, a maximum outer diameter $D_{MAX,bulge}$ of the bulge feature 120 is greater than (i) a maximum outer diameter $D_{MAX,coronal}$ of the coronal portion 111a and (ii) a maximum outer diameter $D_{MAX,collar}$ of the collar 130. As shown, the maximum outer diameter $D_{MAX,coronal}$ of the coronal portion 111a and the maximum outer diameter $D_{MAX,collar}$ of the collar 130 are the same or about the same. Alternatively, the maximum outer diameter $D_{MAX,coronal}$ of the coronal portion 111a and the maximum outer diameter $D_{MAX,collar}$ of the collar 130 may be different, for example, if the dental implant includes platform shifting where the collar 130 has a larger or smaller maximum outer diameter as compared with the maximum outer diameter of the coronal portion 111a.

As shown in FIGS. 1A and 1B, the maximum outer diameter $D_{MAX,bulge}$ of the bulge feature 120 is about 20 percent greater than the maximum outer diameter $D_{MAX,coronal}$ of the coronal portion 111a. Alternatively, the maximum outer diameter $D_{MAX,bulge}$ of the bulge feature 120 can be between about 10 percent and about 30 percent greater than the maximum outer diameter $D_{MAX,coronal}$ of the coronal portion 111a. In some implementations, about 30 percent to about 50 percent of the apical portion 111b (which includes the bulge feature 120 therein) has a larger outer diameter than the coronal portion 111a.

Further, in some implementations, about 20 percent to about 70 percent of the apical portion 111b has a larger outer diameter than the coronal portion 111a. More specifically, in some implementations, about 30 percent to about 50 percent of the apical portion 111b has a larger outer diameter than the coronal portion 111a.

Further, in some implementations, the maximum outer diameter $D_{MAX,coronal}$ of the coronal portion 111a is at least about 20 percent less than (i) the maximum outer diameter $D_{MAX,bulge}$ of the bulge feature 120, (ii) a maximum outer diameter of the outwardly tapered portion 113a, (iii) a maximum outer diameter of the inwardly tapered portion 113b, or (iv) any combination thereof. Alternatively, the maximum outer diameter $D_{MAX,coronal}$ of the coronal portion 111a is between about 15 percent and about 30 percent less than (i) the maximum outer diameter $D_{MAX,bulge}$ of the bulge feature 120, (ii) the maximum outer diameter of the outwardly tapered portion 113a, (iii) the maximum outer diameter of the inwardly tapered portion 113b, or (iv) any combination thereof.

The interior bore 160 of the dental implant 100 is formed in the body 110 and has a threaded portion 165 for receiving a retaining screw that removably holds an abutment in engagement with the dental implant 100. The interior bore 160 also includes therein the non-rotational feature 180, which is shown as including a hexagonal socket feature that can non-rotationally mate with a corresponding non-rotational feature of an abutment in a non-rotational fashion. Various alternative non-rotational features are contemplated for the dental implant 100, such as, for example, a four-sided square or rectangular socket (not shown), a five-sided polygonal socket (not shown), a twelve-sided polygonal/star socket (not shown), a three-piece clover shaped socket (not shown), a triple cone socket (shown in FIG. 4 and described below), one or more splines/grooves (not shown), etc. Further, instead of the non-rotational feature 180 being an internal connection dental implant with an internal socket, the non-rotational feature 180 can be an external connection dental implant with an external boss (not shown). Alternatively to the interior bore 160 including the non-rotational feature 180 (e.g., with a positive non-rotational structure), the interior bore 160 can include a locking conical feature that mates with a corresponding conical feature of an abutment. While the geometry of the conical features do not themselves provide a positive structure to limit and/or prevent relative rotation, the locking conical features rely on friction between the dental implant and abutment and a morse taper geometry of the conical features to provide a relative non-rotational feature.

The interior bore 160 has a bore-central axis $X_{bore}$. The bore-central axis $X_{bore}$ is defined as a straight axis/line that goes through the geometric center and/or the axis of symmetry of at least the interior bore 160 of the dental implant 100. As shown in FIGS. 1A and 1B, the bore-central axis $X_{bore}$ of the interior bore 160 also goes through the geometric center and/or the axis of symmetry of the apical portion 111b of the body 110 of the dental implant 100. This is because the dental implant 100 is a straight-bore dental implant as opposed to an angled-bore dental implant 200 shown in FIGS. 2A and 2B.

Alternatively to describing the body 110 as having the coronal portion 111a, the apical portion 111b, and the collar 130, the body 110 can be described as having an upper portion 112a, a middle portion 112b, and a lower portion 112c. Using such designations, the upper portion 112a of the body 110 includes a generally cylindrical region, which includes, for example, the coronal portion 111a (e.g., with a threaded surface) and/or the collar 130 (e.g., without a threaded surface); the lower portion 112c of the body 110 includes a generally inwardly tapered region (e.g., inwardly tapered in the direction of arrow A); and the middle portion 112b of the body 110 at least includes the bulge feature 120.

Figure 2A:
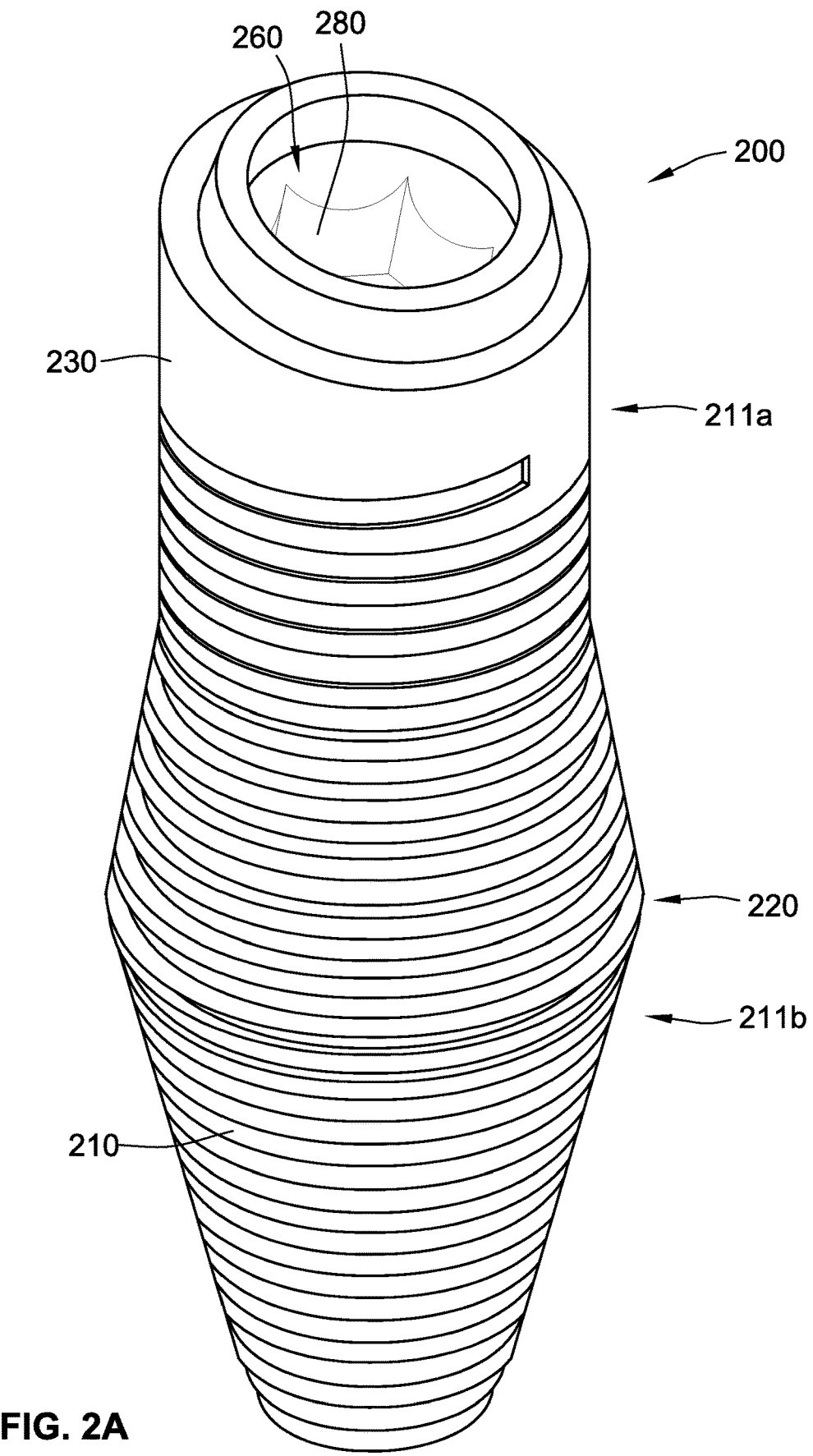
FIG. 2A is a perspective view of an angled-bore dental implant according to some implementations of the present disclosure.
Figure 2B:
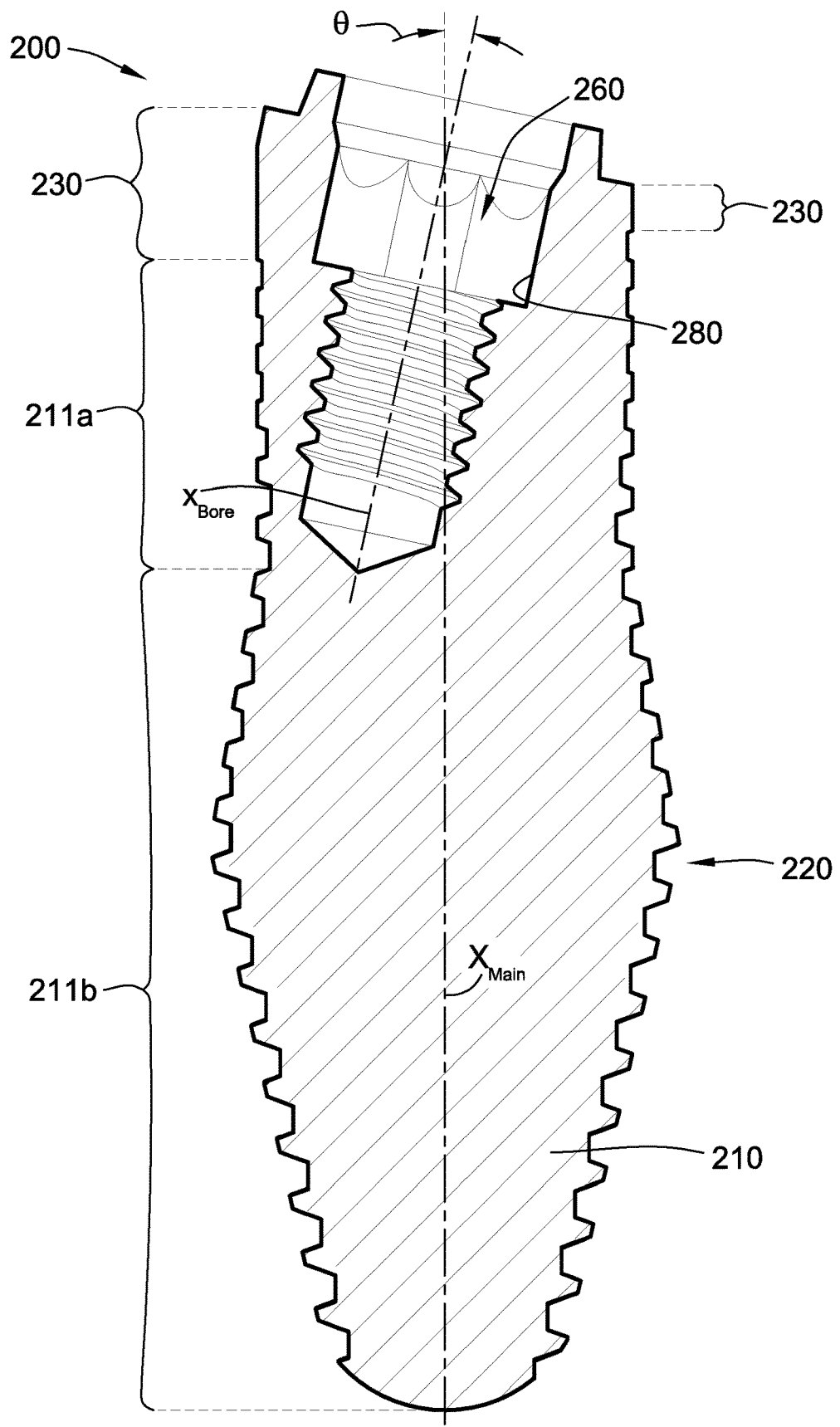
FIG. 2B is a cross-sectional view of the dental implant shown in FIG. 2A.

Now referring to FIGS. 2A and 2B, an angled dental implant 200 having a body 210 is shown that is similar to the dental implant 100 described herein and shown in FIGS. 1A and 1B. However, the angled dental implant 200 generally differs from the dental implant 100 (FIGS. 1A and 1B) in that an angled collar 230 and an angled interior bore 260 of the angled dental implant 200 are angled relative to a main-central axis $X_{min}$ of the angled dental implant 200. For example, the bore-central axis $X_{bore}$ can be at an angle θ relative to the main-central axis $X_{main}$ between about 7° and about 31°. As shown, the bore-central axis $X_{bore}$ is at an angle θ relative to the main-central axis $X_{main}$ of about 12°.

The angled dental implant 200 further includes a non-rotational feature 280 that is the same as, or similar to, the non-rotational feature 180, except that the non-rotational feature 280 is angled relative to the main-central axis $X_{main}$ of the angled dental implant 200 as the non-rotational feature 280 extends into and through the angled collar 230 as a socket. Like the body 110 of the dental implant 100, the body 210 includes a coronal portion 211a and an apical portion 211b including a bulge feature 220, which is the same as, or similar to, the bulge feature 120.

Now referring to FIG. 3A, a partial cross-sectional view of a mouth 301 of a patient is shown. The mouth 301 includes bone 305 and soft tissue 307 (e.g., gingiva) that forms an extraction socket 309 (i.e., a natural tooth has been extracted from the site) to receive dental implant 100 installed therein. As shown in FIG. 3A, the bone 305 is relatively thin near the opening of the extraction socket 309 and gets relatively thicker more apically into the extraction socket 309. More specifically, the bone 305 (e.g., the buccal bone plate 312) on the labial side 310 of the extraction socket is even thinner than the bone 305 (e.g., the lingual bone plate 317) on the palatal side 315 of the extraction socket 309. As such, it can be advantageous to encourage bone grown of the bone 305 on the labial side 310 as described herein by, for example, providing a gap between the bone 305 on the labial side 310 and an installed dental implant (e.g., as shown in FIG. 3C).

Figure 3B:
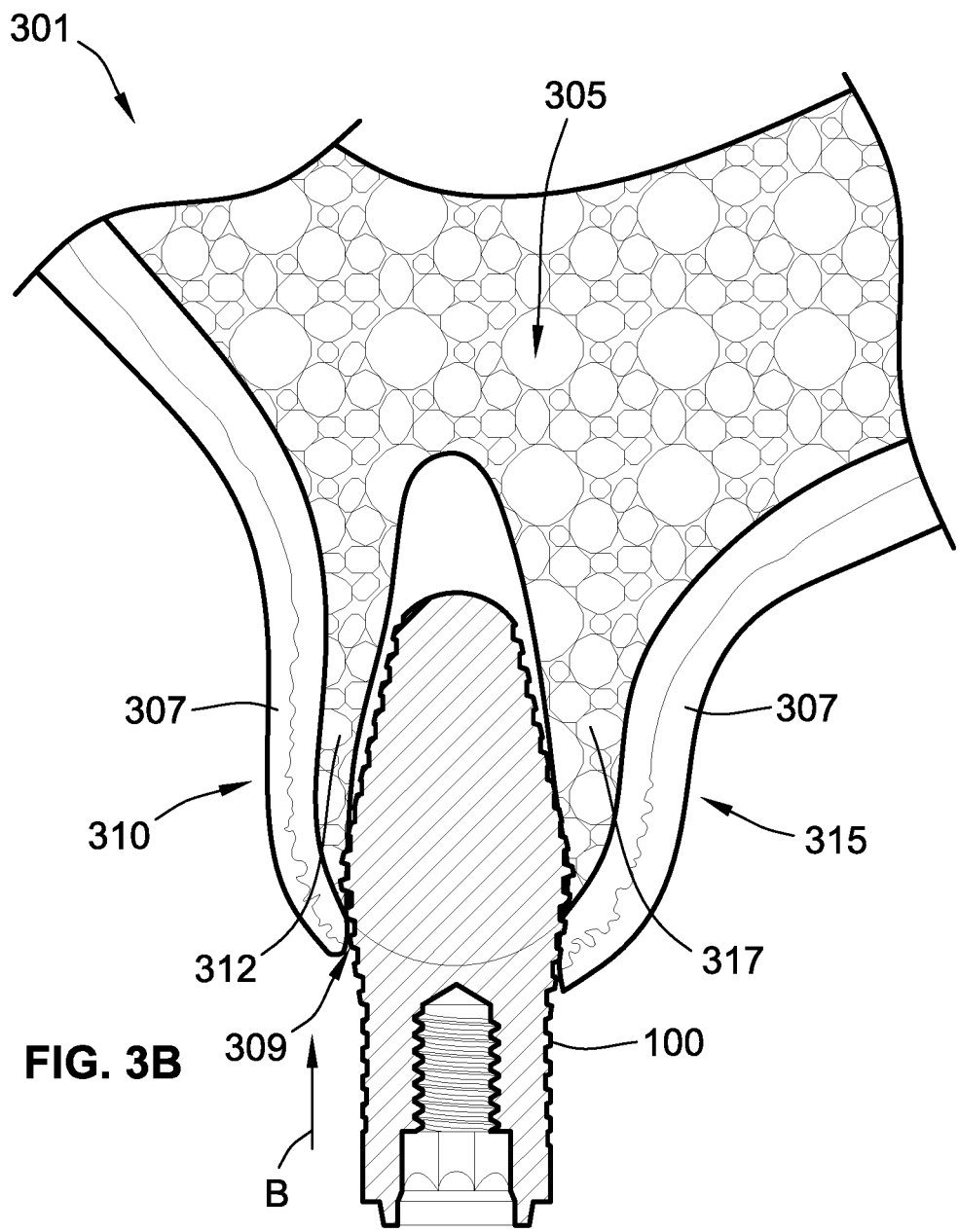
FIG. 3B a partial cross-sectional view that illustrates the dental implant of FIG. 1A being installed in the extraction socket of FIG. 3A.

Referring to FIG. 3B, the dental implant 100 is shown as being partially installed into the extraction socket 309 in the direction of arrow B. FIG. 3C illustrates the dental implant 100 when it is fully installed into the extraction socket 309. Once the dental implant 100 is fully installed into the extraction socket 309, the gap G between the bone 305 on the labial side 310 and the installed dental implant 100 is established. This gap G is typically between about 1 millimeter and about 3 millimeters wide and, more specifically, between about 1.5 millimeter and about 2 millimeters wide. The gap G extends 360 degrees around the coronal portion 111a of the body 110 of the dental implant 100. In some implementations, the gap G is relatively constant around the coronal portion 111a. Alternatively, the gap G can vary about the coronal portion 111a. For example, the gap G may be about 2 millimeters adjacent to the labial side 310 and the gap G may be about 0.5 millimeters adjacent to the palatal side 315. In some implementations, biologic graft materials can be placed in the gap G. Some non-limiting examples of biologic graft materials include hard tissue allografts, xenografts, autogenous, and alloplasts. The biologic graft materials can fill the gap G and act as a scaffold to maintain the volume of gap G during healing for new labial bone plate formation.

With the dental implant 100 fully installed (FIG. 3C), the thread 125 (FIGS. 1A and 1B) in the coronal portion 111a of the dental implant 100 does not directly engage the extraction socket 309. Rather, the thread 125 in the apical portion 111b (e.g., on the bulge feature 120) of the dental implant 100 engages the extraction socket 309 to anchor the dental implant 100 therein providing the primary stability of the installed dental implant 100.

Figure 3C:
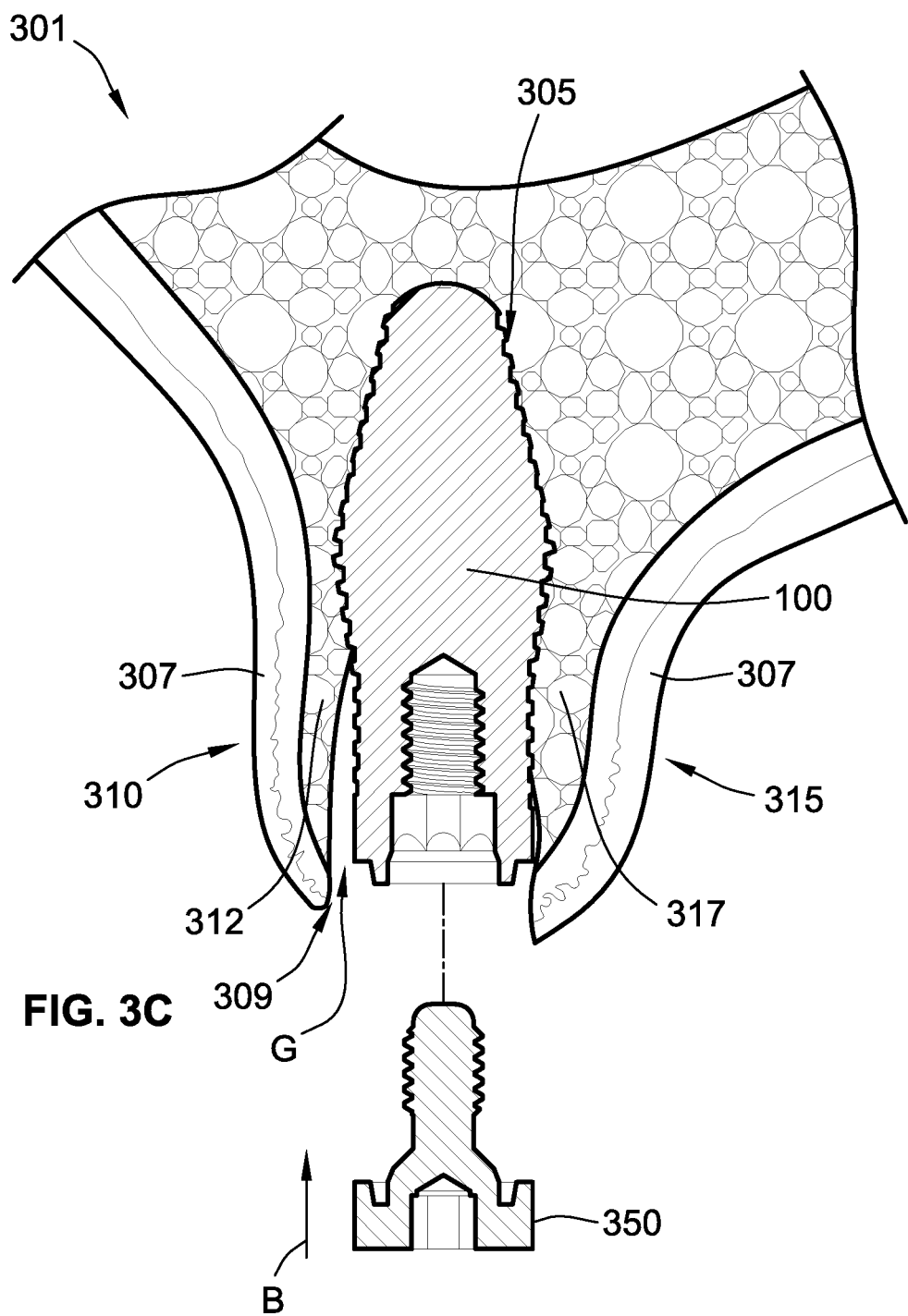
FIG. 3C is a partial cross-sectional view of the dental implant of FIG. 1A fully installed in the extraction socket of FIGS. 3A and 3B and ready to be coupled with a member.
Figure 3D:
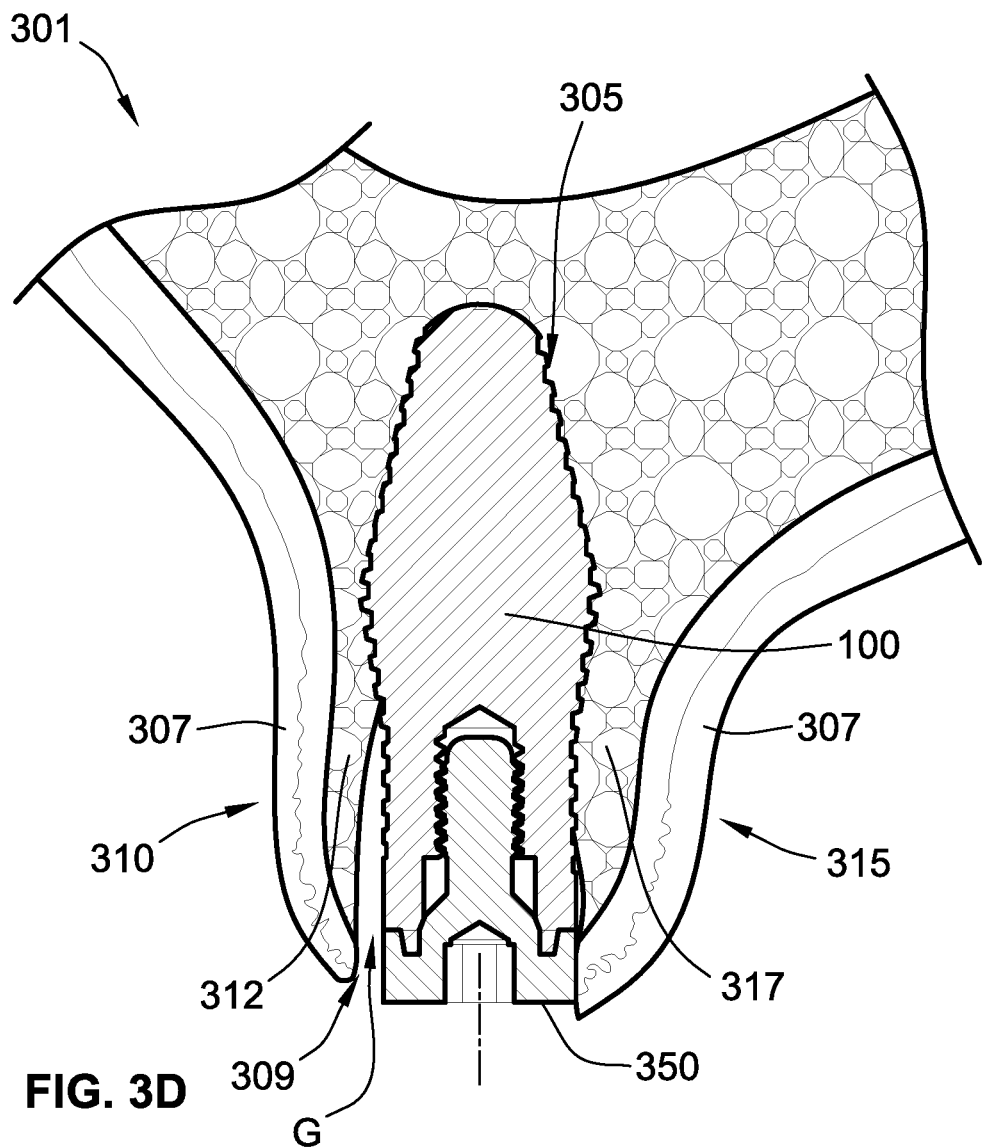
FIG. 3D is a partial cross-sectional view that illustrates the member of FIG. 3C attached to the dental implant of FIG. 1A fully installed in the in the extraction socket of FIGS. 3A and 3B.

After the dental implant 100 has been fully installed, as shown in FIG. 3C, a member 350 can be attached to the dental implant 100 (e.g., in a non-rotational fashion). The member 350 can be a cover screw (e.g., as shown in FIGS. 3C and 3D), a healing abutment, a healing cap, a temporary abutment, a permanent abutment, an attachment member, etc. Further, a temporary or permanent crown (not shown) can be attached to the abutment 350 depending on the stage in the restorative process. The type of abutment 350 and/or the sequence of different abutments 350 that are placed on the dental implant 100 are dependent on the conditions in the patient's mouth 301, the amount of osseointegration, and the clinician's preferred treatment plan.

Figure 4:
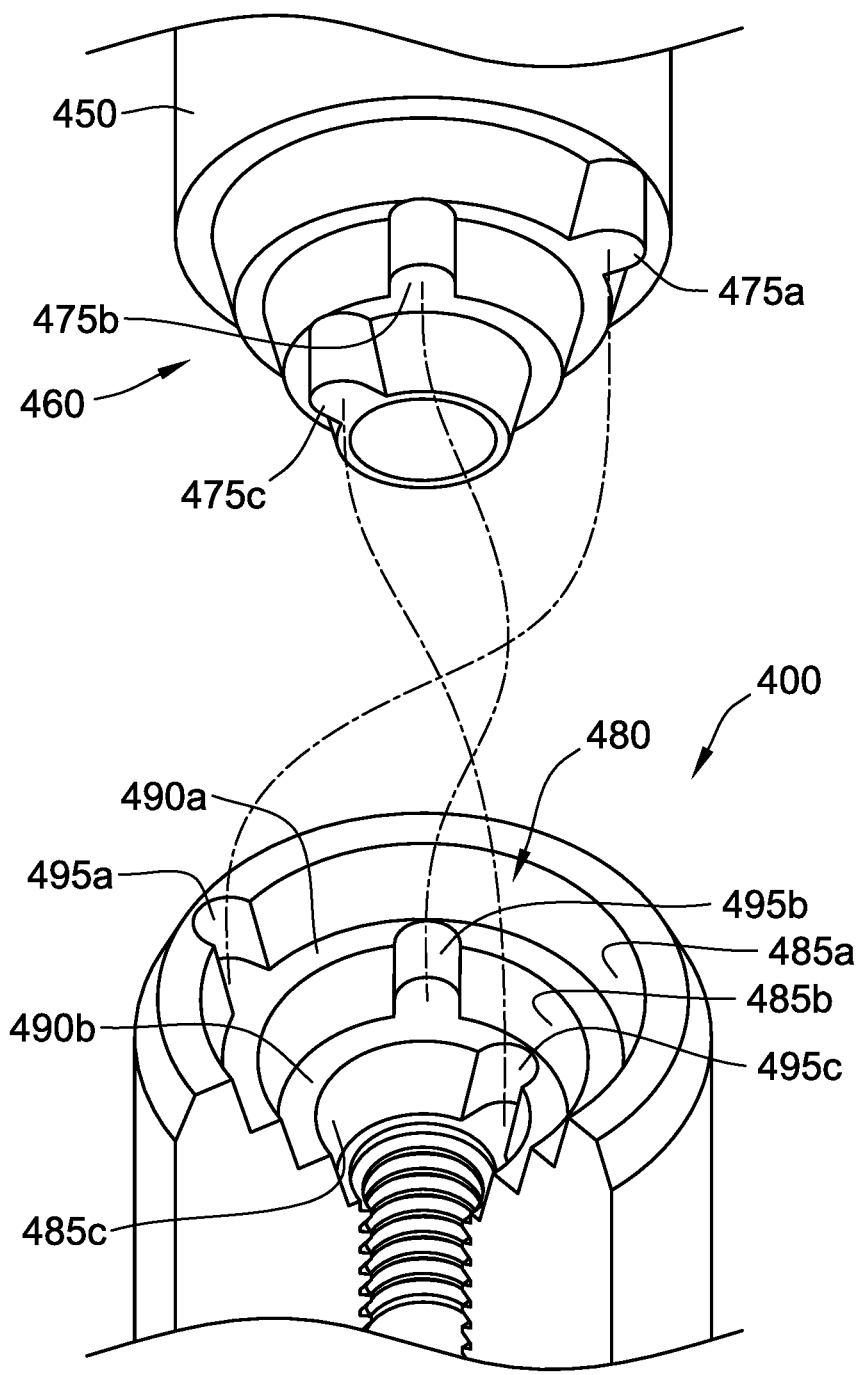
FIG. 4 is a partial perspective view of a dental implant with a triple cone internal connection and an abutment with a triple cone boss according to some implementations of the present disclosure.

As discussed herein, the dental implants of the present disclosure include a non-rotational feature. The non-rotational feature prevents relative rotation between the dental implant and an abutment attached thereto. As shown in FIG. 4, a dental implant 400 includes a non-rotational feature that is a triple cone internal connection 480 that is configured to be non-rotationally coupled with an abutment 450 having a triple cone boss 460. The triple cone internal connection 480 includes three staggered cone shaped surfaces 485a,b,c that are nested within each other thereby creating two internal horizontal flats 490a,b. As the cone shaped surfaces 485a,b,c have a generally round profile, they do not themselves provide a non-rotational function. Rather, each of the cone shaped surfaces 485a,b,c includes a divot or keyway 495a,b,c that mates with a corresponding key 475a,b,c on the corresponding triple cone boss 460 of the abutment 450. As such, the key-keyway coupling prevents relative rotation of the abutment 450 and the dental implant 400. As shown, the keyways 495a,b,c are spaced about a circumference of the triple cone internal connection 480 with a first keyway 495a of the a first one of the cone shaped surfaces 485a positioned at "10 o'clock", a second keyway 495b of the a second one of the cone shaped surfaces 485b positioned at "12 o'clock", and a third keyway 495c of the a third one of the cone shaped surfaces 485c positioned at "2 o'clock". Various other positions for the keyways 495a,b,c are contemplated.

Figure 5:
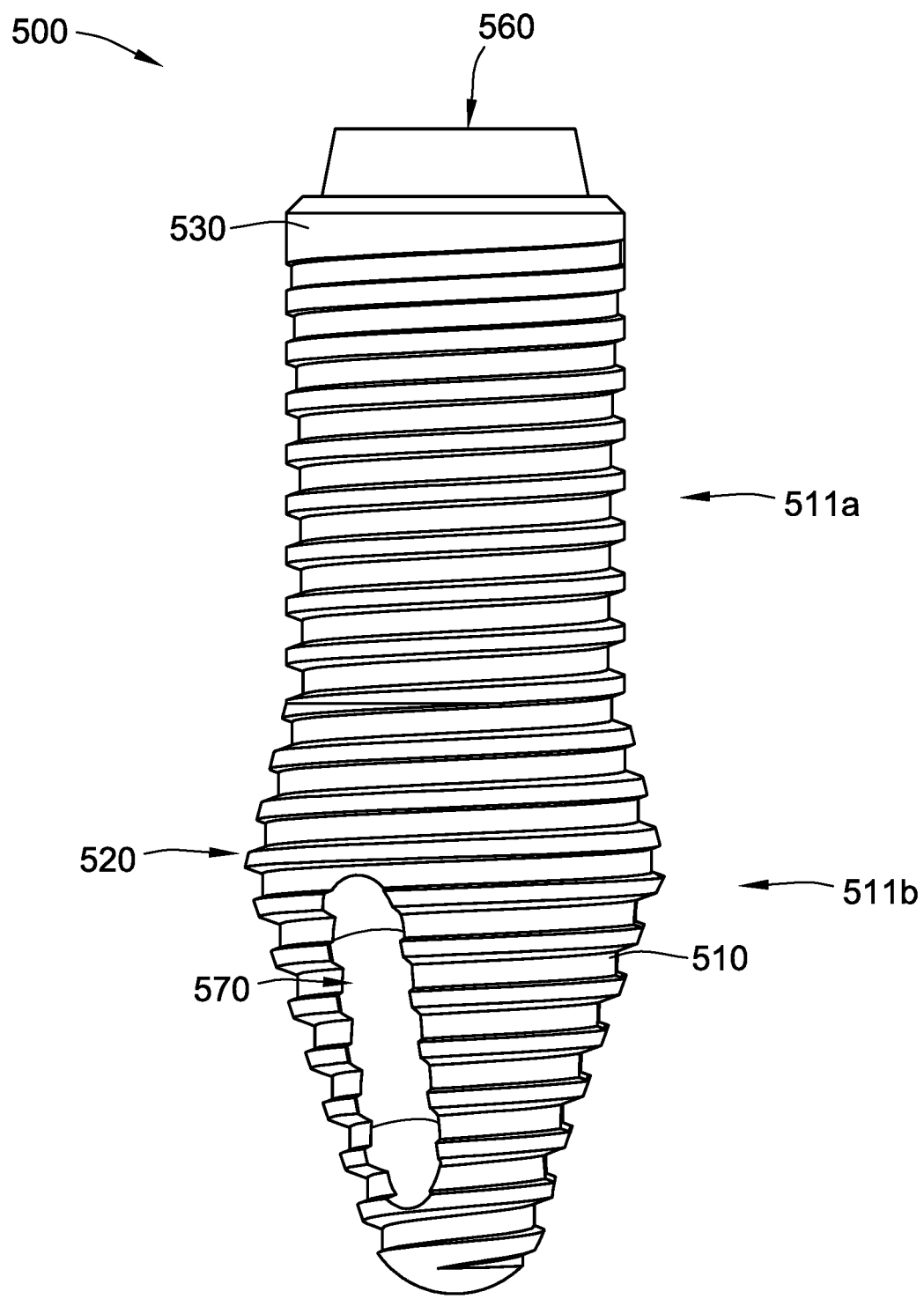
FIG. 5 is a perspective view of a straight-bore dental implant according to some implementations of the present disclosure.

Referring to FIG. 5, a dental implant 500 is shown for installation into a socket in a mouth of a patient (e.g., extraction socket 309 in FIG. 3A). The dental implant 500 includes a body 510, a collar 530, an interior bore 560, and a non-rotational feature (not shown but the same as, or similar to, the non-rotational feature 180). The body 510 has a coronal portion 511a, an apical portion 511b, and a bulge feature 520. The dental implant 500 is the same as, or similar to, the dental implant 100, except that the dental implant 500 generally differs from the dental implant 100 (FIGS. 1A and 1B) in that the bulge feature 520 of the dental implant 500 is relatively lower on the body 510 (e.g., more apical) as compared with the bulge feature 120 of the dental implant 100. As such, the coronal portion 511a of the dental implant 500 is relatively longer than the coronal portion 111a of the dental implant 100. For example, the coronal portion 511a of the dental implant 500 is between about 30 percent and about 40 percent of an overall length of the dental implant 500. More specifically, the coronal portion 511a of the dental implant 500 is about 35 percent of the overall length of the dental implant 500. Further, the dental implant 500 differs from the dental implant 100 (FIGS. 1A and 1B) in that the dental implant 500 includes one or more flutes 570. As shown, the one or more flutes 570 are positioned in an inwardly tapered portion of the apical portion 511b to aid a self-tapping action of the dental implant 500. More specifically, the one or more flutes 570 are positioned in a portion of the bulge feature 520. In some alternative implementations, the one or more flutes 570 can at least be partially positioned in an outwardly tapered portion of the apical portion 511b.

Figure 6A:
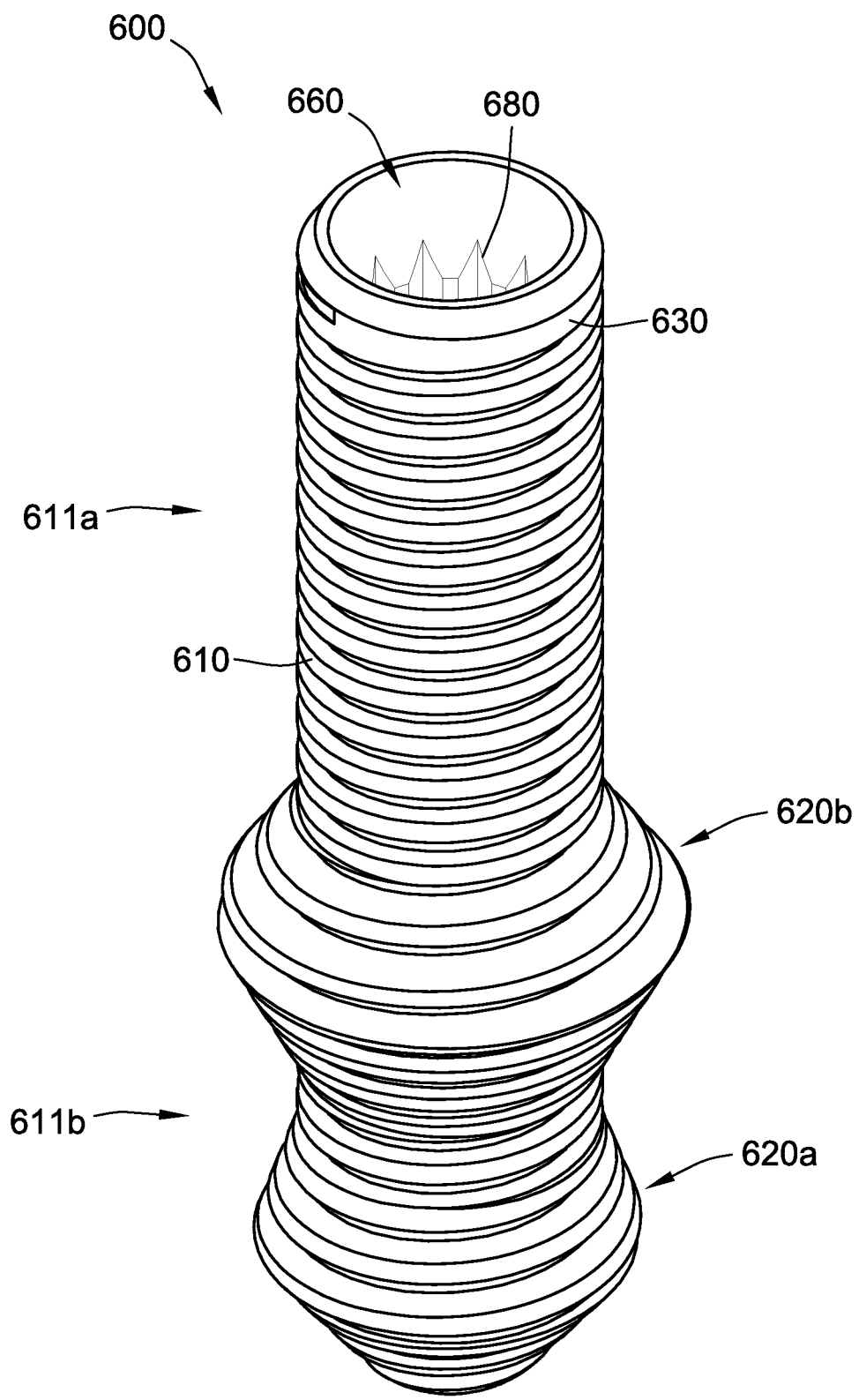
FIG. 6A is a perspective view of a straight-bore dental implant according to some implementations of the present disclosure.
Figure 6B:
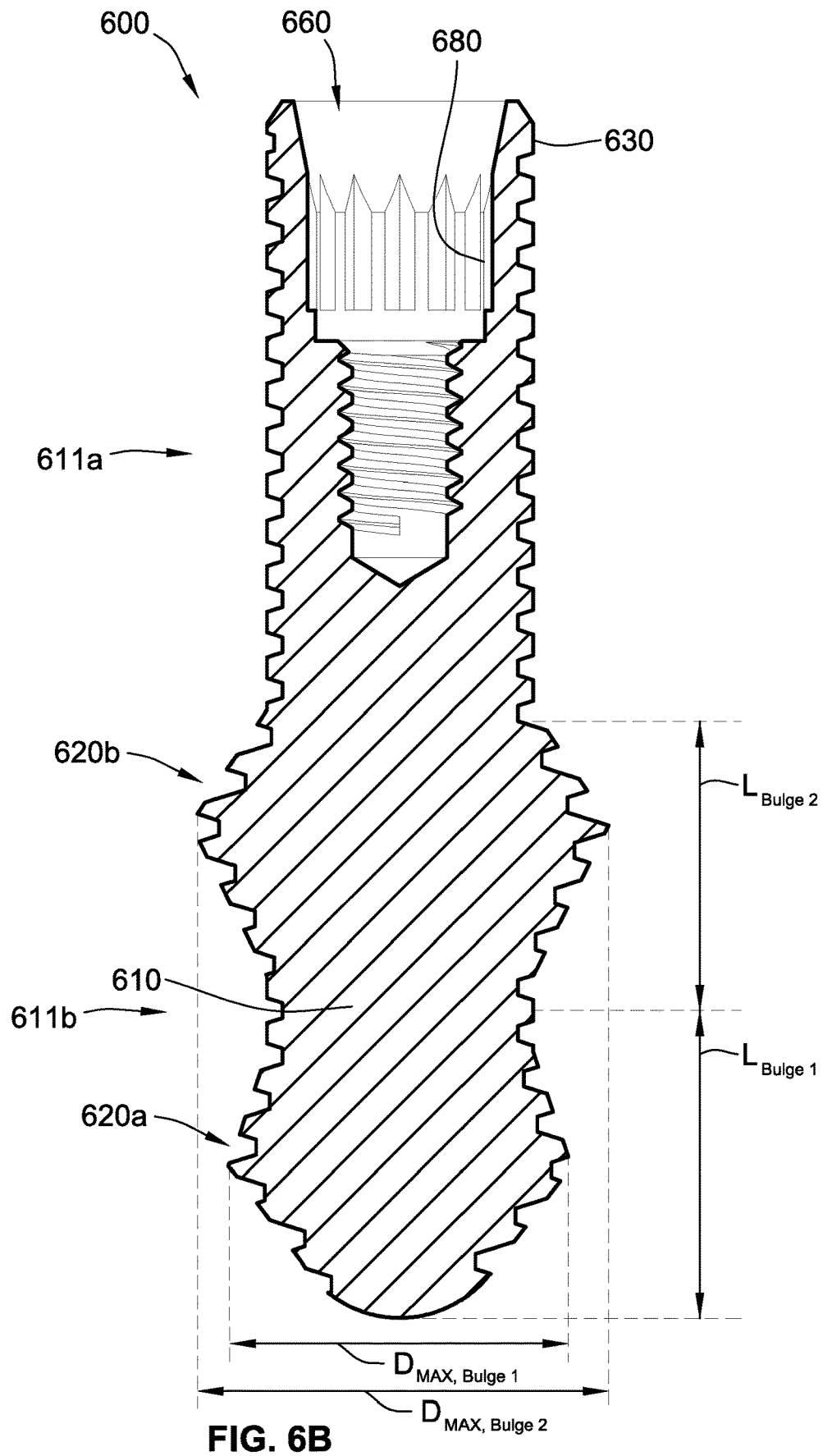
FIG. 6B is a cross-sectional view of the dental implant shown in FIG. 6A.

Referring to FIGS. 6A and 6B, a dental implant 600 is shown for installation into a socket in a mouth of a patient (e.g., extraction socket 309 in FIG. 3A). The dental implant 600 includes a body 610, a collar 630, an interior bore 660, and a non-rotational feature 680. The body 610 has a coronal portion 611a, an apical portion 611b, a first bulge feature 620a, and a second bulge feature 620b. The dental implant 600 is the same as, or similar to, the dental implants 100, 500, except that the dental implant 600 generally differs from the dental implants 100 (FIGS. 1A and 1B) and 500 (FIG. 5) in that the dental implant 600 includes two bulge features 620a, 620b as compared with the single bulge features 120, 520 of the dental implants 100, 500. Each of the first and the second bulge features 620a, 620b can be the same as, or similar to, the bulge feature 120, 220, 520. Additionally, the first and the second bulge features 620a, 620b can be the same as each other or different from each other (e.g., same diameters, same lengths, same curvature, different diameters, different lengths, different curvatures, etc., or any combination thereof). For example, the first bulge feature 620a, which is more apical than the second bulge feature 620b, has a maximum outer diameter $D_{MAX,bulge1}$ (e.g., 4.5 millimeters), which is less than a maximum outer diameter $D_{MAX,bulge2}$ (e.g., 5.5 millimeters) of the second bulge feature 620b; and the first and the second bulge features 620a, 620b have the same length $L_{Bulge1}$, $L_{Bulge2}$, respectively (e.g., about 3.5 millimeters).

Various other combinations of differently sized and positioned first and second bulge features are contemplated. For example, in some such alternatives, the length $L_{Bulge1}$ of the first bulge feature 620a can be less than or greater than the length $L_{Bulge2}$ of the second bulge feature 620b (e.g., five percent less, ten percent less, twenty percent less, thirty percent less, five percent more, ten percent more, twenty percent more, thirty percent more, etc.) or vice versa. For another example, in some such alternatives, the maximum outer diameter $D_{MAX,bulge1}$ of the first bulge feature 620a can be the same as, or less than, or greater than the maximum outer diameter $D_{MAX,bulge2}$ of the second bulge feature 620b (e.g., five percent less, ten percent less, twenty percent less, thirty percent less, five percent more, ten percent more, twenty percent more, thirty percent more, etc.) or vice versa.

According to some alternative implementations, the dental implants of the present disclosure can include any number of bulges, such as, for example, one bulge as shown in FIGS. 1A-3D and 5, two bulges as shown in FIGS. 6A and 6B, three bulges (not shown), four bulges (not shown), etc. In such alternatives, each of the bulges can have the same or different size (e.g., maximum diameter, length, etc.). Further the positioning of the bulges can vary. For example, in some implementations, a first most apical bulge has a first maximum diameter, a second middle bulge has a second maximum diameter, and a third most coronal bulge has a third maximum diameter, where the second maximum diameter of the second bulge is smaller than both the first and the third maximum diameters of the first and third bulges, respectively (i.e., the middle bulge has the smallest maximum diameter. For another example, in some implementations, a first most apical bulge has a first maximum diameter, a second middle bulge has a second maximum diameter, and a third most coronal bulge has a third maximum diameter, where the first maximum diameter is larger than the second and the third maximum diameters and the third maximum diameter is larger than the second maximum diameter.

While the coronal portion 111a (FIGS. 1A and 1B) is shown and described as being a threaded coronal portion 111a having at least a portion of the thread 125 wrapped therearound, in some alternative implementations, the coronal portion 111a or a section of the coronal portion 111a (e.g., ten percent of the coronal portion 111a, twenty percent of the coronal portion 111a, fifty percent of the coronal portion 111a, seventy-five percent of the coronal portion 111a, ninety percent of the coronal portion 111a, etc.) is not threaded and instead of including at least a portion of the thread 125 wrapped therearound, the coronal portion 111a includes one or more rings and/or parallel grooves formed in the exterior surface 114. The coronal portion 211a (FIGS.

2A and 2B) and the coronal portion 511a (FIG. 5) and the coronal portion 611a (FIGS. 6A and 6B) can similarly include one or more rings and/or parallel grooves instead of being threaded.

While the coronal portion 111a (FIGS. 1A and 1B) is shown and described as being a threaded coronal portion 111a having at least a portion of the thread 125 wrapped therearound, in some alternative implementations, the coronal portion 111a or a section of the coronal portion 111a (e.g., ten percent of the coronal portion 111a, twenty percent of the coronal portion 111a, fifty percent of the coronal portion 111a, seventy-five percent of the coronal portion 111a, ninety percent of the coronal portion 111a, etc.) is not threaded and instead of including at least a portion of the thread 125 wrapped therearound, the coronal portion 111a or a section of the coronal portion 111a includes a roughened surface and/or a texturized surface formed on and/or in the exterior surface 114. Additionally, the collar 130 or a portion of the collar 130 can include the same roughened surface and/or texturized surface.

The roughened surface or texturized surface can be formed by any number of processes, such as, for example, acid etching/treatments, grit blasting (e.g., with sand, silicone, titanium, etc.), or any other method of roughening/texturizing surfaces. The roughened surface of the coronal portion 111a (or section thereof) and/or of the collar 130 (or section thereof) includes a plurality of irregularities (e.g., protrusions, dents, valleys, notches, etc.) having a peak-to-valley height no greater than thirty microns. In some implementations, the peak-to-valley height is between one and twenty microns. In some implementations, the peak-to-valley height is between one and ten microns. The coronal portion 211a (FIGS. 2A and 2B) or section thereof and the coronal portion 511a (FIG. 5) or section thereof and the coronal portion 611a (FIGS. 6A and 6B) or section thereof can similarly include a roughened surface and/or a texturized surface instead of being threaded.

While the dental implant 100 (FIGS. 1A and 1B) is shown and described as having the collar 130, in some alternative implementations, the dental implant 100 does not have a collar 130. Rather, in such alternatives, the coronal portion 111a extends all the way to a top edge of the dental implant (not shown) where a table or seating surface for an abutment is located. The dental implant 200 (FIGS. 2A and 2B) and the dental implant 500 (FIG. 5) and the dental implant 600 (FIGS. 6A and 6B) can similarly be formed without the collars 230, 530, 630, respectively.

While the dental implant 100 is shown and described as having the generally cylindrical coronal portion 111a and the collar 130, in some alternative implementations, the dental implant 100 does not have a collar and does not have a generally cylindrical coronal portion. Rather, in such alternatives, the outwardly tapered portion 113a extends all the way to a top edge of the dental implant (not shown) where a table or seating surface for an abutment is located. That is, in such alternatives, the body 110 of the dental implant 100 is outwardly tapered (e.g., in the direction of arrow A) from the top edge to the part of the bulge feature 120 having the maximum outer diameter (e.g., $D_{MAX,BULGE}$). Such an outward taper can be generally straight or curved/variable (e.g., a concave curved taper). The dental implant 200 (FIGS. 2A and 2B) and the dental implant 500 (FIG. 5) and the dental implant 600 (FIGS. 6A and 6B) can similarly be formed without a collar and without a generally cylindrical coronal portion.

While the present disclosure has been described with reference to one or more particular embodiments and implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A dental implant for installation in a socket in a mouth of a patient, the socket being formed by bone, the dental implant comprising:
   a body having a coronal portion and an apical portion, the coronal portion having an exterior surface that is sized and configured to promote bone growth of at least a portion of the bone of the socket in the mouth of the patient after installation of the dental implant therein, the apical portion having an exterior surface that is sized and configured to anchor the dental implant in the bone of the socket in the mouth of the patient, the exterior surface of the coronal portion being generally cylindrical, the apical portion including an outwardly tapered portion and an inwardly tapered portion that together form a bulge feature in the apical portion of the body that aids in the anchoring of the dental implant in the bone;
   a first thread on at least a portion of the coronal portion; and
   a second thread on (i) at least a portion of the outwardly tapered portion of the apical portion and (ii) at least a portion of the inwardly tapered portion of the apical portion, a maximum outer diameter of the second thread being greater than a maximum outer diameter of the first thread.

2. The dental implant of claim 1, wherein the bulge feature extends for 360 degrees around the apical portion of the body.

3. The dental implant of claim 2, wherein the bulge feature is generally symmetric about a central axis of the body.

4. The dental implant of claim 1, wherein about 30 percent to about 50 percent of the apical portion has a larger outer diameter than the coronal portion.

5. The dental implant of claim 1, wherein a maximum outer diameter of the coronal portion of the body is at least about 20 percent less than a maximum outer diameter of the bulge feature.

6. The dental implant of claim 1, wherein the coronal portion extends along about 15 percent to about 50 percent of an overall length of the body and wherein the bulge feature extends along about 30 percent to about 50 percent of the overall length of the body.

7. The dental implant of claim 1, wherein the exterior surface of the coronal portion of the body is generally symmetrical about a central axis of the body.

8. The dental implant of claim 1, wherein a maximum outer diameter of the coronal portion of the body is less than a maximum outer diameter of the outwardly tapered portion of the body, and wherein the dental implant further comprises an interior bore formed in the body, the interior bore having a threaded portion for receiving a retaining screw configured to removable hold an abutment in engagement with the dental implant, the outwardly tapered portion having an outer diameter that increases along the outwardly tapered portion in an apical direction and the inwardly tapered portion has an outer diameter that decreases along the inwardly tapered portion in the apical direction.

9. A dental implant for installation in a socket in a mouth of a patient, the socket being formed by bone, the dental implant comprising:
- an apical portion having an exterior surface that is sized and configured to anchor the dental implant in the bone of the socket in the mouth of the patient, the apical portion including a bulge having an outwardly tapered portion and an inwardly tapered portion that aids in the anchoring of the dental implant in the bone;
- a coronal portion having an exterior surface that in combination with the socket and at least a portion of the outwardly tapered portion of the bulge defines a coronal compartment, the coronal compartment being configured to receive graft material therein to promote bone growth of at least a portion of the bone of the socket in the mouth of the patient after installation of the dental implant therein; and
- an external thread on (i) at least a portion of the coronal portion (ii) at least a portion of the outwardly tapered portion of the bulge, and (iii) at least a portion of the inwardly tapered portion of the bulge, a maximum outer diameter of the bulge, including the external thread, being greater than a maximum outer diameter of the coronal portion, including the external thread.

10. The dental implant of claim 9, wherein the coronal compartment extends 360 degrees around the coronal portion of the dental implant.

11. The dental implant of claim 9, wherein the exterior surface of the coronal portion is generally cylindrical.

12. The dental implant of claim 9, wherein an outer diameter of the bulge that does not include the external thread is greater than the maximum outer diameter of the threaded coronal portion.

13. The dental implant of claim 9, wherein a maximum outer diameter of the bulge is greater than a maximum outer diameter of the coronal portion.

14. The dental implant of claim 9, further comprising one or more grooves formed in the exterior surface of the coronal portion.

15. The dental implant of claim 14, further comprising an external thread on the bulge.

16. The dental implant of claim 9, wherein a length of the inwardly tapered portion is between about 30 percent and about 80 percent of an overall length of the dental implant.

17. The dental implant of claim 16, wherein the length of the inwardly tapered portion is between about 4 millimeters and about 9 millimeters.

18. The dental implant of claim 9, wherein a length of the outwardly tapered portion is between about 10 percent and about 30 percent of an overall length of the dental implant.

19. The dental implant of claim 18, wherein the length of the outwardly tapered portion is between about 1 millimeter and about 5 millimeters.

20. The dental implant of claim 9, wherein the length of the inwardly tapered portion is greater than the length of the outwardly tapered portion.

21. The dental implant of claim 9, wherein the bulge has a length that is between about 30 percent and about 60 percent of an overall length of the dental implant.

22. The dental implant of claim 21, wherein the length of the bulge is between about 4 millimeters and about 9 millimeters.

23. The dental implant of claim 9, wherein an end of the apical portion has a rounded dome shape.

24. The dental implant of claim 9, further comprising a collar portion positioned above the coronal portion.

25. The dental implant of claim 24, wherein the collar portion has a length that is between about 5 percent and about 20 percent of an overall length of the dental implant.

26. The dental implant of claim 24, wherein the collar portion is an angled collar portion.

27. A dental implant for installation in a socket in a mouth of a patient, the socket being formed by bone, the dental implant comprising:
- a body having a coronal portion and an apical portion, the coronal portion having an exterior surface that is sized and configured to promote bone growth of at least a portion of the bone of the socket in the mouth of the patient after installation of the dental implant therein, the apical portion having an exterior surface that is sized and configured to anchor the dental implant in the bone of the socket in the mouth of the patient, the apical portion including an outwardly tapered portion and an inwardly tapered portion that together form a bulge feature in the apical portion of the body that aids in the anchoring of the dental implant in the bone, the exterior surface of the coronal portion being generally outwardly tapered towards the bulge feature; and
- a first threaded surface on the coronal portion; and
- a second threaded surface on the outwardly tapered portion and the inwardly tapered portion of the apical portion, a maximum outer diameter of the second threaded surface being greater than a maximum outer diameter of the first threaded surface.

28. The dental implant of claim 27, wherein about 30 percent to about 50 percent of the apical portion has a larger outer diameter than the coronal portion.

29. The dental implant of claim 27, wherein a maximum outer diameter of the coronal portion of the body is at least about 20 percent less than a maximum outer diameter of the bulge feature.

30. The dental implant of claim 27, wherein the coronal portion extends along about 15 percent to about 50 percent of an overall length of the body and wherein the bulge feature extends along about 30 percent to about 50 percent of the overall length of the body.

31. The dental implant of claim 27, wherein the threaded surface within the coronal portion of the body has a first thread depth and wherein the threaded surface within the bulge feature has a second thread depth that is greater than the first thread depth.

32. The dental implant of claim 27, wherein the maximum outer diameter of the bulge feature, not including the thread surface, is greater than the maximum outer diameter of the coronal portion, including the threaded surface.

33. A dental implant for installation in a socket in a mouth of a patient, the socket being formed by bone, the dental implant comprising:
- a body having a coronal body portion and an apical body portion, the apical body portion including an outwardly extending body bulge that forms a maximum outer diameter of the body for engaging the bone, the apical body portion further including an inwardly tapering portion located apically from the maximum outer diameter of the body;
- a first thread on at least a portion of the coronal body portion; and
- a second thread on at least a portion of an outwardly tapering portion of the outwardly extending body bulge and on at least a portion of the inwardly tapering portion of the apical body portion, a maximum outer diameter of the second thread on the outwardly extending body bulge being greater than a maximum outer diameter of the first thread on the coronal body portion.

34. The dental implant of claim 33, wherein the coronal body portion is generally cylindrical.

35. The dental implant of claim 34, wherein a length of the coronal body portion is between about 30 percent and about 40 percent of an overall length of the dental implant.

36. The dental implant of claim 34, wherein a length of the coronal body portion is about 40 percent of an overall length of the dental implant.

37. The dental implant of claim 34, wherein a length of the coronal body portion is about 45 percent of an overall length of the dental implant.

38. The dental implant of claim 34, wherein a length of the coronal body portion is about 50 percent of an overall length of the dental implant.

39. The dental implant of claim 34, wherein the coronal body portion in combination with at least a portion of the outwardly extending body bulge and the socket defines a coronal compartment.

40. The dental implant of claim 39, wherein the coronal compartment is configured to receive graft material therein to aid in promoting bone growth of at least a portion of the bone of the socket in the mouth of the patient after installation of the dental implant therein.

41. The dental implant of claim 39, wherein the width of the coronal compartment is between about 0.5 millimeters and about 3 millimeters.

42. The dental implant of claim 39, wherein the width of the coronal compartment varies about the coronal body portion of the dental implant.

43. The dental implant of claim 34, wherein a maximum outer diameter of the outwardly extending body bulge is greater than a maximum outer diameter of the generally cylindrical coronal body portion.

44. The dental implant of claim 43, wherein the maximum outer diameter of the outwardly extending body bulge is greater than the maximum outer diameter of the first thread on the at least a portion of the coronal body portion.

45. The dental implant of claim 33, wherein the first thread generally has a first thread cross-sectional shape and the second thread generally has a second thread cross-sectional shape.

46. The dental implant of claim 45, wherein the second thread cross-sectional shape is different than the first thread cross-sectional shape.

47. The dental implant of claim 33, further comprising an interior threaded bore that is located within the coronal body portion and extends towards the outwardly extending body bulge.

48. The dental implant of claim 47, wherein a bore-central axis of the interior threaded bore is at a non-zero angle relative to a main-central axis of the body.

49. The dental implant of claim 48, wherein the non-zero angle is between about 7 degrees and about 31 degrees.

50. The dental implant of claim 48, wherein the non-zero angle is about 12 degrees.

51. The dental implant of claim 33, wherein the first thread is blended into the second thread.

52. A dental implant for installation in a socket in a mouth of a patient, the socket being formed by bone, the dental implant comprising:
a body having an upper body portion, a lower body portion, and a middle body portion between the upper and lower body portions, the middle body portion including an outwardly extending body bulge that forms a maximum outer diameter of the body for engaging the bone, the lower body portion tapering inwardly to a lowermost end of the dental implant;
a first thread on at least a portion of the upper body portion; and
a second thread on at least a portion of an outwardly tapering portion of the outwardly extending body bulge and on at least a portion of the lower body portion, a maximum outer diameter of the second thread on the outwardly extending body bulge being greater than a maximum outer diameter of the first thread on the upper body portion.

53. The dental implant of claim 52, wherein the upper body portion is generally cylindrical.

54. The dental implant of claim 53, wherein a length of the upper body portion is about 35 percent of an overall length of the dental implant.

55. The dental implant of claim 52, wherein the upper body portion includes a coronal body portion and a collar portion.

56. The dental implant of claim 55, wherein the collar portion is an angled collar portion.

57. The dental implant of claim 56, further comprising an interior threaded bore that is at least partially located within the angled collar portion and the coronal body portion and extends towards the outwardly extending body bulge.

58. The dental implant of claim 57, wherein a bore-central axis of the interior threaded bore is at a non-zero angle between about 7 degrees and about 31 degrees relative to a main-central axis of the body.

59. The dental implant of claim 55, wherein a length of the upper body portion is between about 25 percent and about 40 percent of an overall length of the dental implant.

60. The dental implant of claim 55, wherein a length of the upper body portion is about 30 percent of an overall length of the dental implant.

61. The dental implant of claim 55, wherein at least a portion of the upper body portion in combination with at least a portion of the outwardly extending body bulge and the socket defines a coronal compartment having a width that is between about 0.5 millimeters and about 3 millimeters.

62. The dental implant of claim 61, wherein a maximum outer diameter of the outwardly extending body bulge is greater than (i) a maximum outer diameter of the generally cylindrical upper body portion and (ii) the maximum outer diameter of the first thread on the at least a portion of the upper body portion.

63. The dental implant of claim 52, wherein the first thread is blended into the second thread.

64. The dental implant of claim 52, wherein the outwardly extending body bulge includes an outwardly tapered portion and an inwardly tapered portion that together form the outwardly extending body bulge.

65. The dental implant of claim 52, wherein the outwardly extending body bulge extends for 360 degrees around the middle body portion.

66. The dental implant of claim 52, wherein the outwardly extending body bulge is generally symmetric about a central axis of the body.

67. The dental implant of claim 52, wherein the outwardly extending body bulge extends along about 30 percent to about 50 percent of an overall length of the body.

68. The dental implant of claim 52, wherein the first thread has a first thread depth and wherein the second thread has a second thread depth that is greater than the first thread depth.

69. The dental implant of claim 68, wherein the first thread depth is between about 0.1 millimeters and about 0.2 millimeters and wherein the second thread depth is between about 0.3 millimeters and about 0.7 millimeters.

70. The dental implant of claim 68, wherein the first thread depth is between about 0.1 millimeters and about 0.4 millimeters and wherein the second thread depth is between about 0.3 millimeters and about 0.7 millimeters.

71. The dental implant of claim 52, wherein the first thread has a first thread cross-sectional shape and wherein the second thread has a second thread cross-sectional shape that is different than the first thread cross-sectional shape.

* * * * *